US011031991B2

(12) United States Patent
Ryu et al.

(10) Patent No.: US 11,031,991 B2
(45) Date of Patent: Jun. 8, 2021

(54) MULTI-PANEL CONTROL CHANNEL ORDER, INITIAL ACCESS, AND HANDOVER

(71) Applicant: QUALCOMM Incorporated, San Diego, CA (US)

(72) Inventors: Jung Ho Ryu, Fort Lee, NJ (US); Tianyang Bai, Bridgewater, NJ (US); Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/864,108

(22) Filed: Apr. 30, 2020

(65) Prior Publication Data
US 2020/0350977 A1 Nov. 5, 2020

Related U.S. Application Data

(60) Provisional application No. 62/842,778, filed on May 3, 2019.

(51) Int. Cl.
*H04B 7/08* (2006.01)
*H04W 74/00* (2009.01)
(Continued)

(52) U.S. Cl.
CPC ...... *H04B 7/0874* (2013.01); *H04W 56/0045* (2013.01); *H04W 74/004* (2013.01);
(Continued)

(58) Field of Classification Search
CPC .. H04B 7/0404; H04B 7/0617; H04B 7/0691; H04B 7/0874; H04W 36/0072;
(Continued)

(56) References Cited

U.S. PATENT DOCUMENTS

2014/0177607 A1* 6/2014 Li ..................... H04W 52/42
370/336
2015/0020157 A1 1/2015 Kim et al.
(Continued)

FOREIGN PATENT DOCUMENTS

WO WO-2018044693 A1 3/2018
WO WO-2018232090 A1 12/2018

OTHER PUBLICATIONS

International Search Report and Written Opinion—PCT/US2020/031180—ISAEPO—dated Jul. 31, 2020.

*Primary Examiner* — David S Huang
(74) *Attorney, Agent, or Firm* — Holland & Hart LLP

(57) ABSTRACT

Methods, systems, and devices for wireless communications are described. A user equipment (UE) may communicate with a first base station using a first antenna array of a set of antenna arrays of the UE. The UE may receive, from the base station, an indication that the UE is to use a second antenna array of the set of antenna arrays to transmit a random access signal. The UE may transmit, to the first base station or a second base station, the random access signal using the second antenna array based on the received indication. The UE may transmit the random access signal to the first base station as part of determining an updated timing advance (TA) value for the second antenna array. The UE may transmit the random access signal to the second base station as a part of initial access or handover.

30 Claims, 20 Drawing Sheets

(51) Int. Cl.
*H04W 74/08* (2009.01)
*H04W 56/00* (2009.01)
*H04W 36/00* (2009.01)
*H04W 76/15* (2018.01)
*H04W 36/08* (2009.01)

(52) U.S. Cl.
CPC ..... *H04W 74/006* (2013.01); *H04W 74/0833* (2013.01); *H04W 36/0077* (2013.01); *H04W 36/08* (2013.01); *H04W 76/15* (2018.02)

(58) Field of Classification Search
CPC . H04W 36/0077; H04W 36/08; H04W 36/18; H04W 56/0045; H04W 74/004; H04W 74/006; H04W 74/0833; H04W 76/15
See application file for complete search history.

(56) References Cited

U.S. PATENT DOCUMENTS

2018/0332520 A1* 11/2018 Cheng .................. H04B 7/0617
2019/0182682 A1* 6/2019 Kim ...................... H04W 16/28

* cited by examiner

MULTI-PANEL CONTROL CHANNEL ORDER, INITIAL ACCESS, AND HANDOVER

CROSS REFERENCE

The present Application for Patent claims the benefit of U.S. Provisional Patent Application No. 62/842,778 by RYU et al., entitled "MULTI-PANEL CONTROL CHANNEL ORDER, INITIAL ACCESS, AND HANDOVER," filed May 3, 2019, assigned to the assignee hereof, and expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may communicate with a first base station, then initiate access with or switch to communicating with another base station through an initial access or handover procedure. Performing initial access or handover may involve the first base station communicating information about the other base station to the UE. The UE may then use the information to initiate communications with the other base station.

Whether communicating with the first base station or the other base station, the UE may transmit uplink transmissions to the base station according to a timing advance (TA). The timing advance may be equal to an expected propagation delay multiplied by two, and may enable the UE to account for propagation delays associated with transmissions to the base station over a wireless medium.

SUMMARY

The described techniques relate to improved methods, systems, devices, and apparatuses that support multi-panel control channel order, initial access, and handover. Generally, the described techniques provide for a user equipment (UE) to determine a panel or antenna array for transmitting a random access signal (e.g., a physical random access channel (PRACH) signal) when performing initial access, handover, or a timing advance (TA) adjustment procedure. For instance, a UE may have a set of multiple antenna arrays. The UE may communicate with a first base station using a first antenna array of the set of antenna arrays. The UE may receive, from the base station, an indication that the UE is to use a second antenna array of the set of antenna arrays to transmit a random access signal (e.g., the PRACH signal). The UE may then transmit, to the first base station or a second base station, the random access signal using the second antenna array based on the received indication.

In one example, the UE may transmit the random access signal to the first base station as part of determining an updated timing advance (TA) value for the second antenna array. In such cases, the received indication may be a control channel order (e.g., a physical downlink control channel (PDCCH) order) containing a preamble index that the UE may use to determine the second antenna array. In one example, the UE may receive the control channel order from the first base station and may determine the second antenna array. The UE may use the second antenna array to transmit the random access signal to the first base station. The first base station may transmit a TA value for the second antenna array in response to the transmitted random access signal.

In another example, the UE may transmit the random access signal to the second base station as a part of initial access or handover. For instance, the UE may receive a signal indicating that the UE is to establish a connection with the second base station (e.g., for a dual connectivity configuration), where the signal may indicate the second antenna array. The signal may be, for instance, included in a radio resource control reconfiguration (RRC) message, downlink control information (DCI), or a medium access control (MAC) control element (CE). Alternatively, the UE may transmit a second message to the first base station indicating the second antenna array. In either case, the UE may use the indicated second antenna array to transmit the random access signal as a part of initial access or handover.

A method of wireless communication at a UE is described. The method may include communicating with a first base station using a first antenna array of a set of antenna arrays of the UE, receiving, from the first base station, an indication that the UE is to use a second antenna array of the set of antenna arrays to transmit a random access signal, and transmitting, to the first base station or a second base station, the random access signal using the second antenna array based on the received indication.

An apparatus for wireless communication at a UE is described. The apparatus may include a processor, memory in electronic communication with the processor, and instructions stored in the memory. The instructions may be executable by the processor to cause the apparatus to communicate with a first base station using a first antenna array of a set of antenna arrays of the UE, receive, from the first base station, an indication that the UE is to use a second antenna array of the set of antenna arrays to transmit a random access signal, and transmit, to the first base station or a second base station, the random access signal using the second antenna array based on the received indication.

Another apparatus for wireless communication at a UE is described. The apparatus may include means for communicating with a first base station using a first antenna array of a set of antenna arrays of the UE, receiving, from the first base station, an indication that the UE is to use a second antenna array of the set of antenna arrays to transmit a random access signal, and transmitting, to the first base station or a second base station, the random access signal using the second antenna array based on the received indication.

A non-transitory computer-readable medium storing code for wireless communication at a UE is described. The code may include instructions executable by a processor to communicate with a first base station using a first antenna array of a set of antenna arrays of the UE, receive, from the first base station, an indication that the UE is to use a second antenna array of the set of antenna arrays to transmit a random access signal, and transmit, to the first base station or a second base station, the random access signal using the second antenna array based on the received indication.

In some examples of the method, apparatuses, and non-transitory computer-readable medium described herein, receiving the indication may include operations, features, means, or instructions for receiving a control channel order that includes the indication that the UE may be to use the second antenna array to transmit the random access signal.

In some examples of the method, apparatuses, and non-transitory computer-readable medium described herein, the received control channel order may include operations, features, means, or instructions for identifying a mapping between a set of preamble indices and a set of antenna arrays, and determining the second antenna array to use transmit the random access signal based on the preamble index and the identified mapping.

In some examples of the method, apparatuses, and non-transitory computer-readable medium described herein, receiving the received control channel order that may include operations, features, means, or instructions for receiving a downlink control information indicating the second antenna array.

Some examples of the method, apparatuses, and non-transitory computer-readable medium described herein may further include operations, features, means, or instructions for receiving, before receiving the control channel order that includes the indication, a downlink reference signal associated with the second antenna array, and determining to use the second antenna array to transmit the random access signal based on the received downlink reference signal being associate with the second antenna array.

Some examples of the method, apparatuses, and non-transitory computer-readable medium described herein may further include operations, features, means, or instructions for receiving the indication includes receiving, from the first base station, a signal indicating that the UE may be to establish a connection with the second base station, the received signal indicating the second antenna array, and transmitting the random access signal may include operations, features, means, or instructions for transmitting the random access signal to the second base station using the second antenna array based on the received signal.

Some examples of the method, apparatuses, and non-transitory computer-readable medium described herein may further include operations, features, means, or instructions for performing, using the second antenna array indicated by the received signal, an initial access procedure with the second base station, where the transmitted random access signal may be a part of the initial access procedure, the first base station may be a primary base station of a dual connectivity configuration, and the second base station may be a secondary base station of the dual connectivity configuration.

Some examples of the method, apparatuses, and non-transitory computer-readable medium described herein may further include operations, features, means, or instructions for performing, using the second antenna array indicated by the received signal, a handover procedure from the first base station to the second base station, where the transmitted random access signal may be a part of the handover procedure, the first base station may be a source base station of the handover procedure, and the second base station may be a target base station of the handover procedure.

In some examples of the method, apparatuses, and non-transitory computer-readable medium described herein, the received signal includes a radio resource control reconfiguration message, or a MAC control element (CE), or a downlink control information.

Some examples of the method, apparatuses, and non-transitory computer-readable medium described herein may further include operations, features, means, or instructions for receiving the indication includes receiving, from the first base station, a first message indicating that the UE may be to establish a connection with the second base station, the method further includes transmitting, to the first base station, a second message indicating the second antenna array that the UE may be to use to establish the connection with the second base station, and transmitting the random access signal may include operations, features, means, or instructions for transmitting the random access signal to the second base station using the second antenna array based on the transmitted second message.

Some examples of the method, apparatuses, and non-transitory computer-readable medium described herein may further include operations, features, means, or instructions for performing, using the second antenna array indicated by the transmitted second message, an initial access procedure with the second base station, where the transmitted random access signal may be a part of the initial access procedure, the first base station may be a primary base station of a dual connectivity configuration, and the second base station may be a secondary base station of the dual connectivity configuration.

Some examples of the method, apparatuses, and non-transitory computer-readable medium described herein may further include operations, features, means, or instructions for performing, using the second antenna array indicated by the transmitted second message, a handover procedure from the first base station to the second base station, where the transmitted random access signal may be a part of the handover procedure, the first base station may be a source base station of the handover procedure, and the second base station may be a target base station of the handover procedure.

In some examples of the method, apparatuses, and non-transitory computer-readable medium described herein, the received first message includes a radio resource control reconfiguration message, and the transmitted second message includes a radio resource control reconfiguration complete message.

Some examples of the method, apparatuses, and non-transitory computer-readable medium described herein may further include operations, features, means, or instructions for receiving the indication includes, receiving, from the first base station, a first signal indicating that the UE may be to establish a connection with the second base station, receiving, from the first base station, a second signal indicating the second antenna array, and transmitting the random access signal may include operations, features, means, or instructions for transmitting the random access signal to the second base station using the second antenna array based on the received signal.

In some examples of the method, apparatuses, and non-transitory computer-readable medium described herein, the first signal includes a radio resource control reconfiguration message, and the second signal includes a MAC control element (CE) or a downlink control information indicating the second antenna array.

Some examples of the method, apparatuses, and non-transitory computer-readable medium described herein may further include operations, features, means, or instructions for receiving, from the first base station in response to the transmitted random access signal, a timing advance value for the second antenna array.

In some examples of the method, apparatuses, and non-transitory computer-readable medium described herein, each antenna array of the set of antenna arrays may be associated with a different one of a set of antenna modules of the UE.

A method of wireless communication at a first base station is described. The method may include communicating with a UE, identifying a set of antenna arrays of the UE, the set of antenna arrays including at least a first antenna array used to communicate with the first base station and a second antenna array, and transmitting, to the UE, an indication that the UE is to use the second antenna array to transmit a random access signal to the first base station or a second base station.

An apparatus for wireless communication at a first base station is described. The apparatus may include a processor, memory in electronic communication with the processor, and instructions stored in the memory. The instructions may be executable by the processor to cause the apparatus to communicate with a UE, identify a set of antenna arrays of the UE, the set of antenna arrays including at least a first antenna array used to communicate with the first base station and a second antenna array, and transmit, to the UE, an indication that the UE is to use the second antenna array to transmit a random access signal to the first base station or a second base station.

Another apparatus for wireless communication at a first base station is described. The apparatus may include means for communicating with a UE, identifying a set of antenna arrays of the UE, the set of antenna arrays including at least a first antenna array used to communicate with the first base station and a second antenna array, and transmitting, to the UE, an indication that the UE is to use the second antenna array to transmit a random access signal to the first base station or a second base station.

A non-transitory computer-readable medium storing code for wireless communication at a first base station is described. The code may include instructions executable by a processor to communicate with a UE, identify a set of antenna arrays of the UE, the set of antenna arrays including at least a first antenna array used to communicate with the first base station and a second antenna array, and transmit, to the UE, an indication that the UE is to use the second antenna array to transmit a random access signal to the first base station or a second base station.

Some examples of the method, apparatuses, and non-transitory computer-readable medium described herein may further include operations, features, means, or instructions for receiving, from the UE based on the transmitted indication, the random access signal, and transmitting, to the UE in response to the received random access signal, a timing advance value for the second antenna array.

In some examples of the method, apparatuses, and non-transitory computer-readable medium described herein, transmitting the indication may include operations, features, means, or instructions for transmitting a control channel order that includes the indication that the UE may be to use the second antenna array to transmit the random access signal.

Some examples of the method, apparatuses, and non-transitory computer-readable medium described herein may further include operations, features, means, or instructions for identifying a mapping between a set of preamble indices and a set of antenna arrays of the UE, and determining a preamble index corresponding to the second antenna array that the UE may be to use to transmit the random access signal, where the transmitted indication includes the determined preamble index.

In some examples of the method, apparatuses, and non-transitory computer-readable medium described herein, transmitting the received control channel order that may include operations, features, means, or instructions for transmitting a downlink control information indicating the second antenna array.

Some examples of the method, apparatuses, and non-transitory computer-readable medium described herein may further include operations, features, means, or instructions for transmitting, before transmitting the control channel order that includes the indication, a downlink reference signal associated with the second antenna array, the UE to use the second antenna array to transmit the random access signal based on the downlink reference signal being associate with the second antenna array.

In some examples of the method, apparatuses, and non-transitory computer-readable medium described herein, transmitting the indication may include operations, features, means, or instructions for transmitting a signal indicating that the UE may be to establish a connection with the second base station, the transmitted signal indicating the second antenna array.

In some examples of the method, apparatuses, and non-transitory computer-readable medium described herein, the signal indicating that the UE may be to establish a connection with the second base station includes a request for the UE to perform an initial access procedure with the second base station, where the first base station may be a primary base station of a dual connectivity configuration, and the second base station may be a secondary base station of the dual connectivity configuration.

In some examples of the method, apparatuses, and non-transitory computer-readable medium described herein, the signal indicating that the UE may be to establish a connection with the second base station includes a request for the UE to perform a handover procedure to the second base station, where the first base station may be a source base station of the handover procedure, and the second base station may be a target base station of the handover procedure.

In some examples of the method, apparatuses, and non-transitory computer-readable medium described herein, the transmitted signal includes a radio resource control reconfiguration message, or a MAC control element (CE), or a downlink control information.

Some examples of the method, apparatuses, and non-transitory computer-readable medium described herein may further include operations, features, means, or instructions for transmitting the indication includes transmitting, to the UE, a first message indicating that the UE may be to establish a connection with the second base station, and the method further includes receiving, from the UE, a second message indicating the second antenna array that the UE may be to use to establish the connection with the second base station.

In some examples of the method, apparatuses, and non-transitory computer-readable medium described herein, the second message indicates that the UE may be to perform an initial access procedure with the second base station.

In some examples of the method, apparatuses, and non-transitory computer-readable medium described herein, the second message indicates that the UE may be to perform a handover procedure with the second base station.

In some examples of the method, apparatuses, and non-transitory computer-readable medium described herein, the transmitted first message includes a radio resource control reconfiguration message, and the received second message includes a radio resource control reconfiguration complete message.

In some examples of the method, apparatuses, and non-transitory computer-readable medium described herein, transmitting the indication may include operations, features, means, or instructions for transmitting, to the UE, a first signal indicating that the UE may be to establish a connection with the second base station, and transmitting, to the UE, a second signal indicating the second antenna array.

In some examples of the method, apparatuses, and non-transitory computer-readable medium described herein, the first signal includes a radio resource control reconfiguration message, and the second signal includes a MAC control element (CE) or a downlink control information indicating the second antenna array.

DETAILED DESCRIPTION

Figure 1:
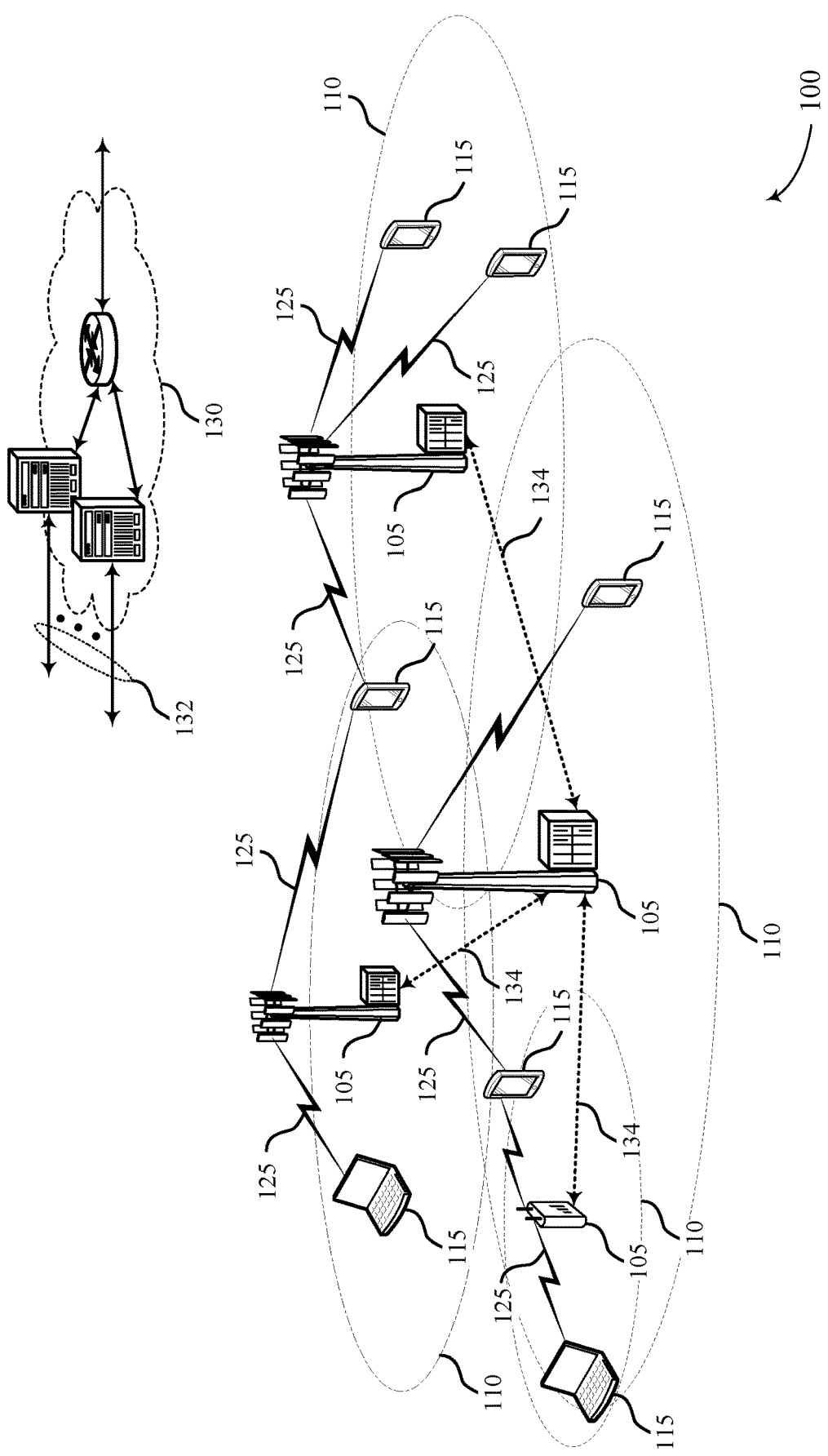
FIG. 1 illustrates an example of a wireless communications system that supports multi-panel control channel order, initial access, and handover in accordance with aspects of the present disclosure.

A user equipment (UE) may transmit a random access signal (e.g., a physical random access channel (PRACH) signal) to a base station. The UE may transmit the PRACH signal as a part of handover, initial access, or a timing advance (TA) adjustment procedure. Performing handover may involve a UE switching from communicating with a source base station to communicating with a target base station. Performing initial access may involve a UE establishing a connection with a new base station while maintaining a connection with a current base station, for example to establish a dual connectivity configuration. Performing a TA adjustment procedure may involve a UE updating a TA that the UE may use to account for propagation delays associated with communication with a base station.

In some cases, a UE may have multiple antenna arrays, which may also be referred to as panels. An antenna array may be a set of antennas or antenna elements, one or more of which may operate together as a unit to transmit or receive wireless signal (e.g., using beamforming). The antenna arrays may be placed at different locations on the UE, which may improve coverage in different directions. Multiple antenna arrays may be active at a given time and different antenna arrays may be used for different procedures. For instance, different sets of antenna arrays may be used for handover, receiving PDCCH orders, transmitting PRACH, initial access, or other procedures. Using different antenna arrays may enable enhanced coverage. For instance, different antenna arrays may receive signals with different signal to interference noise ratio (SINR) values, reference signal received power (RSRP) values, and/or signal to noise ratio (SNR) values. Using the antenna arrays among the multiple antenna arrays with a highest SINR, RSRP, or SNR values for a particular base station or antenna array of a base station may enable more effective communications.

When performing handover or initial access, one antenna array of the UE may initially be communicating with a first base station. At a later point in time, the UE may attempt to initiate communications with a second base station on a second antenna array. If the UE is performing handover, the UE may cease communicating with the first base station after successfully initiating communications with the second base station. If the UE is performing initial access, the UE may continue communicating with the first base station after successfully initiating communications with the second base station.

Whether performing handover or initial access, either the first base station may indicate to the UE or the UE may indicate to the first base station which antenna array the UE is to use to initiate communications with the second base station. In one example, the first base station may transmit an RRC reconfiguration message (e.g., RRCReconfig) to the UE that indicates which antenna array is to be used as the second antenna array. In another example, the UE may transmit an RRC reconfiguration response message (e.g., RRCReconfigComplete) to the first base station that indicates which antenna array is to be used as the second antenna array. In yet another example, the first base station may transmit a medium access control (MAC) control element (MAC-CE) or downlink control information (DCI) to the UE that indicates which antenna array is to be used as the second antenna array. The MAC-CE or DCI may be sent after an RRC reconfiguration message is sent. Whatever the case, upon receiving the indication, the UE may transmit a PRACH to the second base station from the second antenna array as part of performing handover or initial access.

Prior to performing a TA adjustment procedure, a UE may be communicating with a base station via a first antenna array and via a second antenna array. The first antenna array may be associated with a first path along which to send uplink transmissions and the second antenna array may be associated with a second path along which to send uplink transmissions. If the first and second paths have different lengths, the first and second paths may be associated with different propagation delays and, by extension, may be associated with different TAs.

At some point while communicating with the first and second antenna arrays, the base station may determine that a TA of one of the antenna arrays has changed. Upon determining that a change has occurred, the UE may perform a TA adjustment procedure. Performing the TA adjustment procedure may involve the base station transmitting a PDCCH order to the first or second antenna array of the UE. The PDCCH order may contain an indication of which antenna array is to have its TA updated. The indication may be explicit (e.g., a direct control field or a mapping from a preamble index to an antenna array identifier (ID)) or may be implicit (e.g., the UE may assume that an antenna array used to receive a downlink reference signal is to have its TA updated). In either case, upon receiving the PDCCH order, the UE may transmit a PRACH from the antenna array whose TA is to be updated. Upon receiving the PRACH, the base station may transmit a random access response (RAR) to the UE containing the updated TA value. The UE may use the updated TA value to transmit future transmissions to the base station from the indicated antenna array.

Aspects of the disclosure are initially described in the context of a wireless communications system. Additional aspects of the disclosure are described in the context of an additional wireless communications system, a TA adjustment procedure, a communication initiation procedure, and a process flow. Aspects of the disclosure are further illustrated by and described with reference to apparatus diagrams, system diagrams, and flowcharts that relate to multi-panel control channel order, initial access, and handover.

FIG. 1 illustrates an example of a wireless communications system 100 that supports multi-panel control channel order, initial access, and handover in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer, which may also be referred to as a media access control layer, may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_F=307,200$ Ts. The radio frames may be identified by a system frame number (SFN) ranging from 0 to 1023. Each frame may include 10 subframe numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, downlink control information (DCI) for a random access procedure initiated by a PDCCH order may be associated with a predefined format (e.g., DCI format 1_0). Such DCI may have its cyclic redundancy check (CRC) scrambled by a cell radio network temporary identifier (C-RNTI). Additionally, such DCI may have a field (e.g., a "frequency domain resource assignment" field) whose values are all set to one. Additionally such DCI may have a random access preamble index field with 6 bits, an uplink or supplementary uplink indicator with 1 bit, a synchronization signal (SS) or physical broadcast channel (PBCH) index with 6 bits, a PRACH mask index with 4 bits, and 10 reserved bits. The number of bits for any of these fields may vary.

If the random access preamble index field is not all zeros and if a UE 115 is configured with supplementary uplink in a cell, the uplink or supplementary uplink indicator field may indicate which uplink carrier in the cell is to transmit PRACH. If the random access preamble index field is not all zeros, the SS or PBCH index field may indicate the SS or PBCH that is to be used for determining a random access channel (RACH) occasion for a PRACH transmission. If the random access preamble index field is not all zeros, the PRACH mask index may indicate the RACH occasion associated with the SS or PBCH indicated by the SS or PBCH index field for the PRACH transmission. If the random access preamble index field contains all zeros, the uplink or supplementary indicator field, the SS or PBCH index field, the PRACH mask index field, or a combination thereof may be reserved.

Generally, the described techniques may enable efficient means to implement multi-panel control channel order, initial access, and handover. For instance, a UE 115 may communicate with a first base station 105 using a first antenna array of a set of antenna arrays of the UE 115. The UE 115 may receive, from the base station 105, an indication that the UE 115 is to use a second antenna array of the set of antenna arrays to transmit a random access signal (e.g., a PRACH signal). The UE 115 may transmit, to the first base station 105 or a second base station 105, the random access signal using the second antenna array based on the received indication.

The UE 115 may transmit the random access signal to the first base station 105 as part of determining an updated TA value for the second antenna array. In such cases, the received indication may be a control channel order (e.g., a PDCCH order) containing a preamble index that the UE 115 may use to determine the second antenna array. In one example, the UE 115 may receive the control channel order from the first base station 105 and may determine the second antenna array. The UE 115 may use the second antenna array to transmit the random access signal to the first base station 105. The first base station 105 may transmit a TA value for the second antenna array in response to the transmitted random access signal.

The UE 115 may transmit the random access signal to the second base station 105 as a part of an initial access or handover procedure. For instance, the UE 115 may receive a signal indicating that the UE 115 is to establish a connection with the second base station 105, where the signal may indicate the second antenna array. The signal may be, for instance, an RRC reconfiguration message or may be a MAC. Alternatively, the UE 115 may transmit a second message to the first base station 105 indicating the second antenna array. In either case, the UE 115 may use the indicated second antenna array to transmit the random access signal as a part of initial access or handover.

In general, UEs 115 that use multiple panels or antenna arrays to perform handover or initial access may have more efficient coverage than UEs 115 which perform handover or initial access with a single antenna array or panel. Panels or antenna arrays which face in a direction of a base station 105 may be associated with higher RSRP, SNR, or SINR values for communication with that base station 105 than panels or antenna arrays which face away from the base station 105. As such, if a UE 115 employs a panel or antenna array for a first base station 105 which most closely faces the first base station 105 and also employs a panel or antenna array for a second base station 105 which most closely faces the second base station 105, the UE 115 may more efficiently provide coverage. Additionally, using multiple panels or antenna arrays may enable the UE 115 to maintain communication with a first base station 105 while accessing or communicating with a second base station 105. Additionally, indicating the second antenna array by a base station 105 may enable the network to have control over which antenna arrays or panels the corresponding UE 115 is to use. Indicating the second antenna array by a UE 115, meanwhile, may enable the UE 115 to not rely on messaging from a base station 105 to determine the second antenna array.

With regards to updating TA, UEs 115 which use multiple panels or antenna arrays in updating TA may have a higher likelihood of successfully updating the TA. For instance, if the communication path associated with a first panel or antenna array has changed, a base station 105 may use a different path associated with a second panel or antenna array to transmit a control channel order (e.g., a PDCCH order).

Figure 2:
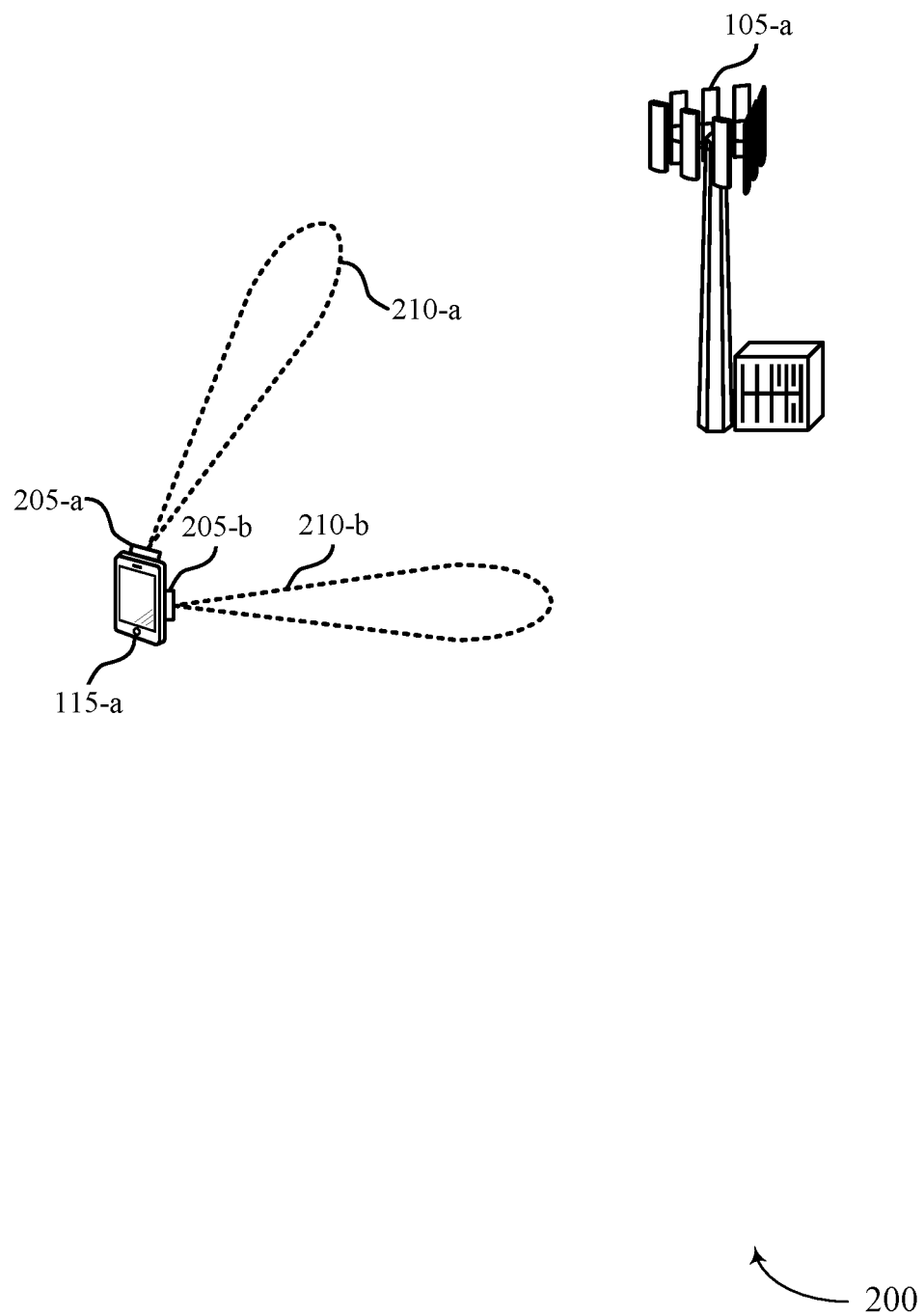
FIG. 2 illustrates an example of a wireless communications system that supports multi-panel control channel order, initial access, and handover in accordance with aspects of the present disclosure.

FIG. 2 illustrates an example of a wireless communications system 200 that supports multi-panel control channel order, initial access, and handover in accordance with aspects of the present disclosure. In some examples, wireless communications system 200 may implement aspects of wireless communications system 100. For instance, UE 115-*a* may be an example of a UE 115 as described with reference to FIG. 1 and base station 105-*a* may be an example of a base station 105 as described with reference to FIG. 1. UE 115-*a* may have a first antenna array 205-*a* and a second antenna array 205-*b*. Antenna array 205-*a* may be capable of forming beam 210-*a* and antenna array 205-*b* may be capable of forming beam 210-*b*.

In some cases, UE 115-*a* may communicate with a same base station 105 (e.g., base station 105-*a*) using multiple antenna arrays 205. For instance, UE 115-*a* may communicate with base station 105-*a* using antenna array 205-*a* and antenna array 205-*b*. When transmitting uplink transmissions, UE 115-*a* may account for a propagation delay and align with a frame timing of the base station 105 by using a TA. Each antenna array 205 may have a different propagation delay, which may be due to having different propagation paths and/or being in different physical locations on UE 115-*a*. As such, each antenna array 205 may have different TA values. In general, a longer propagation path or delay may be associated with a larger TA.

If no uplink transmission is received at the base station 105 from an antenna array 205 (e.g., antenna array 205-*a*) for a predefined period of time, base station 105 may assume that a TA associated with that antenna array 205 has changed. To acquire a new TA value, the base station 105 may issue a PDCCH order (e.g., or another type of control channel order) to UE 115-*a*. The PDCCH order may be sent to any of the antenna arrays 205 (e.g., either antenna array 205-*a* or 205-*b*). In general, the PDCCH order may be panel or antenna array-specific and may be carried by a predefined type of DCI (e.g., DCI format 1_0).

In one example, the PDCCH order may include explicit signaling of the antenna array. For instance, the PDCCH order may include a PRACH preamble index (e.g., a random access preamble index as described with reference to FIG. 1), which UE 115-*a* may directly map to a panel or antenna array identifier (ID). Alternatively, the PDCCH order may include a separate control field in DCI directly indicating which antenna array is to be used for PRACH transmission (e.g., a control field directly specifying a panel or antenna array ID). In some cases, the separate control field may reuse at least part of reserved bits in the DCI (e.g., the reserved bits of DCI format 1_0 as described with reference to FIG. 1).

In another example, the PDCCH order may include implicit signaling of the antenna array. For instance, if a downlink reference signal (e.g., a synchronization signal block (SSB)) is already associated with a panel or antenna array ID, UE 115-*a* may use the panel or antenna array corresponding to the panel or antenna array ID upon receiving the DCI triggering the PDCCH order. In one example, if a spatial reference signal (e.g., as SSB1) is associated with antenna array 205-*a* in some or all active spatial relations, UE 115-*a* may use antenna array 205-*a* for PRACH if SSB1 is signaled in the DCI (e.g., signaled by the SS or PBCH index field of DCI format 1_0 as described herein, for example with reference to FIG. 1).

After receiving the PDCCH order, UE 115-*a* may transmit a PRACH transmission using the antenna array 205 whose TA is to be updated (e.g., antenna array 205-*a*), which the base station 105 may use to calculate an updated TA value. Base station 105 may transmit the updated TA value to UE 115-*a* through a RAR message, which may be transmitted to any of the antenna arrays 205 (e.g., either antenna array 205-*a* or 205-*b*). In general, the RAR may contain the TA value for the antenna array which transmitted the PRACH preamble.

In other cases, UE 115-*a* may communicate with different base stations 105 (e.g., base station 105-*a* and one other base station 105) over different antenna arrays 205. In one example, UE 115-*a* may communicate with a master node on antenna array 205-*a* and may communicate with a secondary node on antenna array 205-*b*. In some cases UE 115-*a* may initially be communicating with a master node on antenna array 205-*a* and may attempt to initiate communications with a secondary node on antenna array 205-*b*. To initiate communications with the secondary node, UE 115-*a* may perform an initial access procedure with the secondary node on antenna array 205-*b*. Performing the initial access procedure on a separate antenna array 205 (e.g., antenna array 205-*b*) from the antenna array 205 communicating with the master node (e.g., antenna array 205-*a*) may limit interference between signals for the initial access procedure and signals between antenna array 205-*a* and the master node.

When performing initial access, either the master node or UE 115-*a* may indicate which antenna array 205 is to be used for initial access. In one example, the master node may transmit an RRC reconfiguration message (e.g., RRCReconfig) to UE 115-*a* which contains RRC information of the secondary node. The RRC reconfiguration message may contain a control field (e.g., a control field in RRCReconfig) to indicate which antenna array 205 that UE 115-*a* is to use for initial access. In another example, the master node may still transmit the RRC reconfiguration message, but the RRC reconfiguration message may not contain the control field indicating which antenna array 205 that UE 115-*a* is to use for initial access. Instead, UE 115-*a* may determine the antenna array 205 to be used for initial access and may include a control field indicating the antenna array 205 in an RRC reconfiguration response message (e.g., RRCReconfigComplete) to the master node. The RRC reconfiguration response message may be sent in response to the RRC reconfiguration message (e.g., RRCReconfig) sent by the master node.

In another example, UE 115-*a* may initially communicate with a first base station 105 on antenna array 205-*a* and may attempt to perform handover to a second base station 105 on antenna array 205-*b*. Performing handover on antenna array 205-*b* may enable UE 115-*a* to transmit signaling to the second base station 105 at a higher SNR, SINR, or RSRP than if UE 115-*a* transmitted signaling to the second base station 105 on antenna array 205-*a*.

As a part of handover, either the first base station 105 or UE 115-*a* may indicate which antenna array 205 is to be used for handover. In one example, the master node may transmit an RRC reconfiguration message (e.g., RRCReconfig) to set up measurements utilized in handover. The RRC reconfiguration message may contain a control field (e.g., a control field in RRCReconfig) to indicate which antenna array 205 UE 115-*a* is to use for handover. In another example, the first base station 105 may still transmit the RRC reconfiguration message, but the RRC reconfiguration message may not contain the control field indicating which antenna array 205 UE 115-*a* is to use for handover. Instead, UE 115-*a* may determine the antenna array 205 to be used for handover and may include a control field indicating the antenna array 205 in an RRC reconfiguration response message (e.g., RRCReconfigComplete) to the first base station 105.

Alternatively, the master node or first base station 105 may use a MAC-CE or DCI to indicate the antenna array 205 to be used for initial access or handover, respectively. For instance, a MAC-CE or DCI may be sent separately after the RRC reconfiguration message from the master node or first base station 105 which may indicate a latest panel or antenna array ID based on a latest measurement report. The latest measurement report may be received after the RRC reconfiguration message is sent from the master node or the first base station 105.

Figure 3:
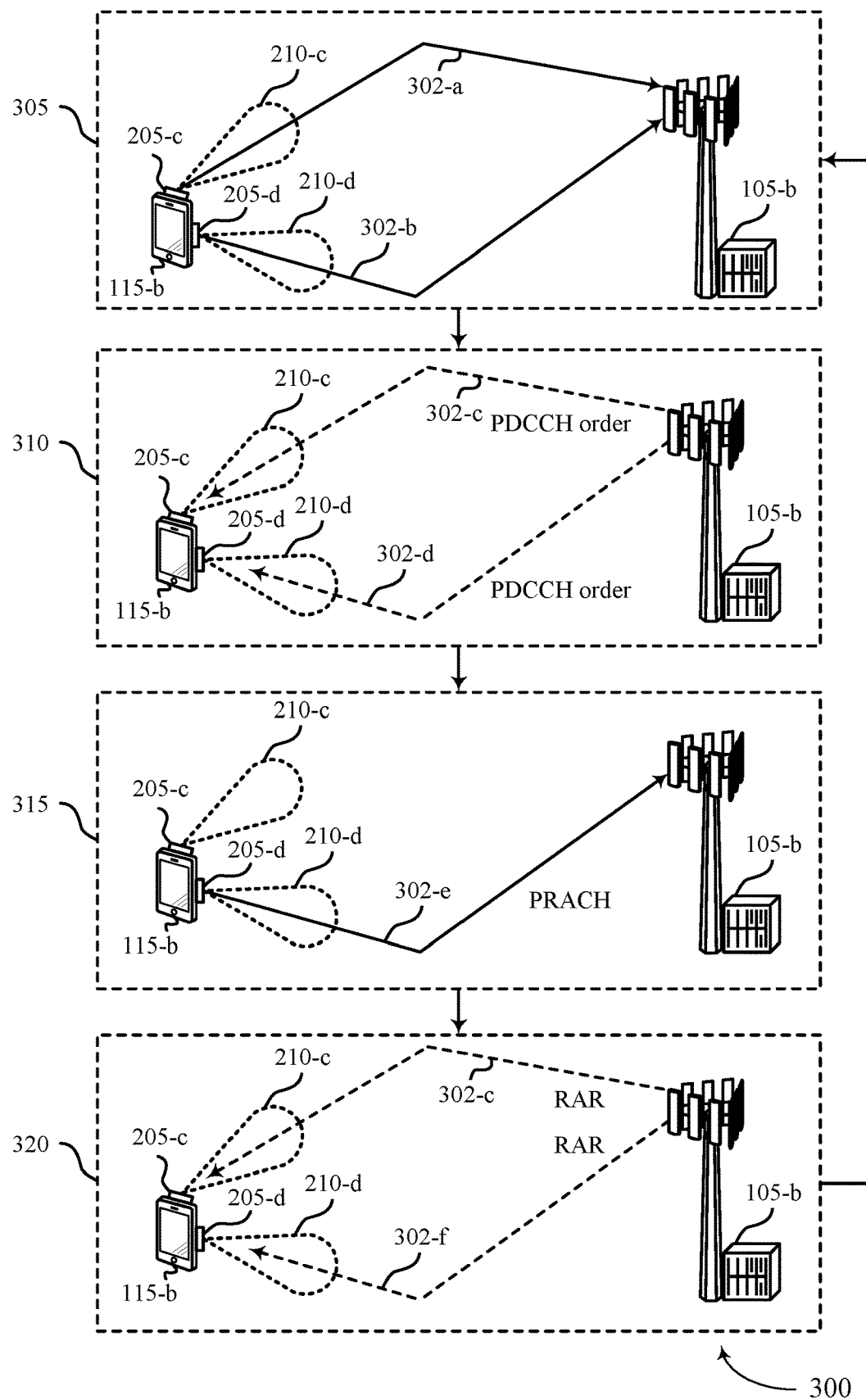
FIG. 3 illustrates an example of a timing advance (TA) adjustment procedure that supports multi-panel control channel order, initial access, and handover in accordance with aspects of the present disclosure.

FIG. 3 illustrates an example of a TA adjustment procedure 300 that supports multi-panel control channel order, initial access, and handover in accordance with aspects of the present disclosure. In some examples, TA adjustment procedure 300 may be implemented by aspects of wireless communications system 100. For instance, TA adjustment procedure 300 may be implemented by UE 115-*b*, which may be an example of a UE 115 as described with reference to FIG. 1, as well as base station 105-*b*, which may be an example of a base station 105 as described with reference to FIG. 1.

At 305, UE 115-*b* may transmit uplink transmissions to base station 105-*b* via paths 302-*a* and 302-*b*. UE 115-*b* may transmit uplink transmissions along path 302-*a* via antenna array 205-*c* and may transmit uplink transmissions along path 302-*b* via antenna array 205-*d*. Path 302-*a* may be associated with a first TA and path 302-*b* may be associated with a second, different TA.

At some point, the second TA may change. The second TA may change, for instance, due to a change in the medium between base station 105-*b* and UE 115-*b* and/or due to a change in path 302-*b*. Base station 105-*b* may determine that the second TA value has changed, for example based on failing to receive transmissions from antenna array 205-*d* for a predefined amount of time. Upon determining that the second TA value has changed, base station 105-*b* may proceed to 310.

At 310, base station 105-*b* may transmit a PDCCH order (e.g., or other control channel order), as described with reference to FIGS. 1 and 2, along path 302-*c*, or 302-*d*, or both. Path 302-*c* may be a reciprocal or inverse path to path 302-*a* and path 302-*d* may be a reciprocal or inverse path to path 302-*b*. If the PDCCH order is transmitted along path 302-*c*, UE 115-*b* may receive the PDCCH order via beam 210-*c*. If the PDCCH order is transmitted along path 302-*d*, UE 115-*b* may receive the PDCCH order via beam 210-*d*. Upon receiving the PDCCH order, UE 115-*b* may proceed to 315.

At 315, UE 115-*b* may transmit a PRACH along path 302-*e* using antenna array 205-*d*. Path 302-*e* may be the same as path 302-*b* or may be a different path 302. UE 115-*b* may determine to use antenna array 205-*d* to transmit the PRACH based on an antenna array-specific indication included in the PDCCH order. Upon receiving the PRACH, base station 105-*b* may proceed to 320.

At 320, base station 105-*b* may transmit a RAR along path 302-*c*, or 302-*f*, or both. Path 302-*f* may be a reciprocal of one of path 302-*b* or 302-*e* or may be a different path 302 completely. The RAR may include an updated TA value for antenna array 205-*d*. Upon receiving the RAR, UE 115-*b* may apply the updated TA value and may begin transmitting uplink transmissions to base station 105-*b* along path 302-*e*. UE 115-*b* may continue to transmit uplink transmissions along paths 302-*a* and 302-*e* until base station 105-*b* detects that a TA associated with one of antenna arrays 205-*c* or 205-*d* has changed. Upon detecting the change, the process may repeat (UE 115-*b* and base station 105-*b* may follow 310, 315, and 320).

Figure 4:
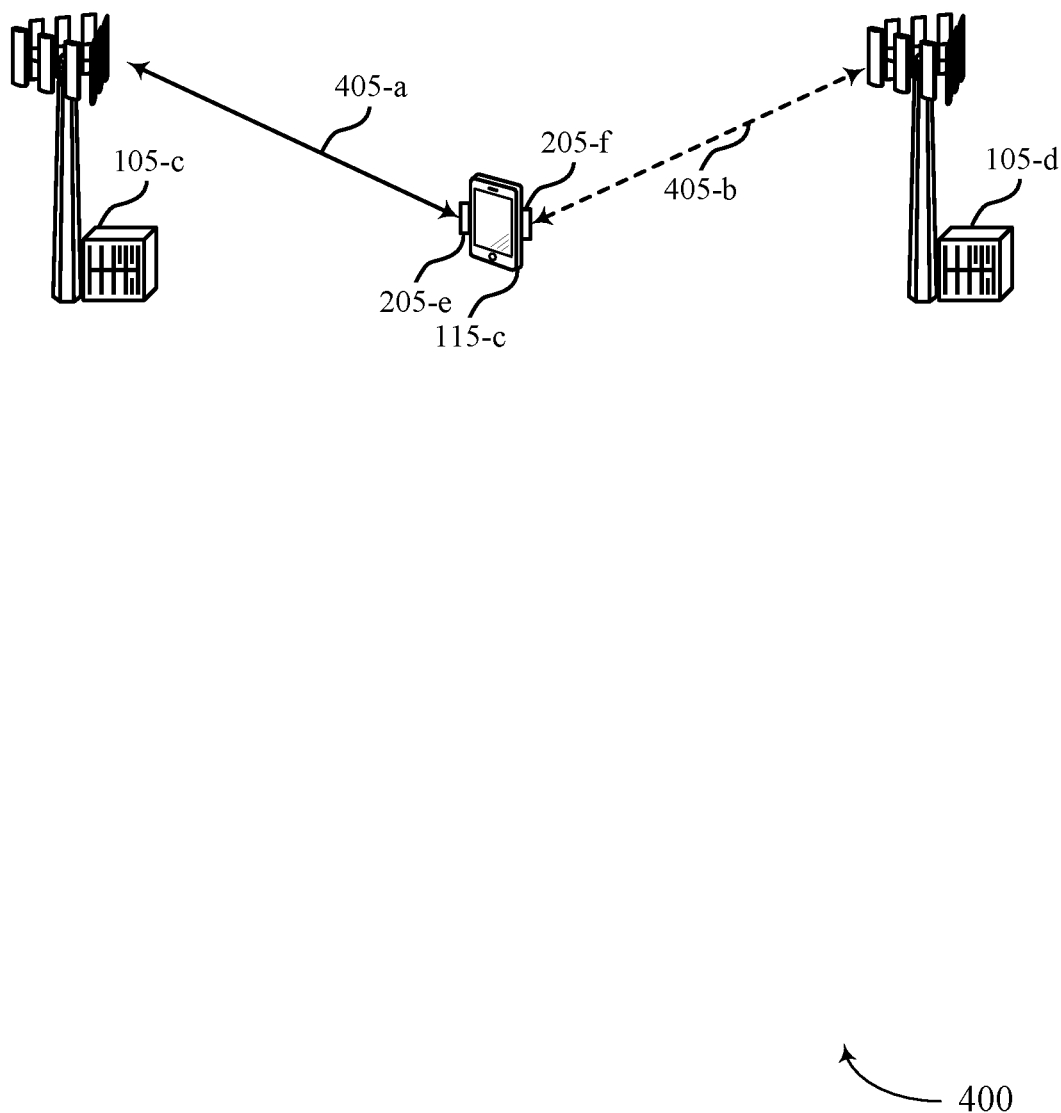
FIG. 4 illustrates an example of a communication initiation procedure that supports multi-panel control channel order, initial access, and handover in accordance with aspects of the present disclosure.

FIG. 4 illustrates an example of a communication initiation procedure 400 that supports multi-panel control channel order, initial access, and handover in accordance with aspects of the present disclosure. In some examples, communication initiation procedure 400 may be implemented by aspects of wireless communications system 100. For instance, communication initiation procedure may be implemented by UE 115-*c*, which may be an example of a UE 115 as described with reference to FIG. 1, as well as base stations 105-*c* and 105-*d*, which may be examples of base stations 105 as described with reference to FIG. 1. UE 115-*c* may initially communicate with base station 105-*c* along communication link 405-*a* using antenna array 205-*e*.

In one scenario, UE 115-*c* may determine to initiate communications with base station 105-*d* via antenna array 205-*f*. Initiating communications may include, for instance, transmitting a PRACH from antenna array 205-*f* to base station 105-*d*. In one example, UE 115-*c* may receive an RRC reconfiguration message (e.g., an RRCReconfig message) from base station 105-*c* containing RRC information related to base station 105-*d*. UE 115-*c* may transmit an RRC reconfiguration response message (e.g., an RRCReconfigComplete message) to base station 105-*c* in response to receiving the RRC reconfiguration message. Base station 105-*c* may indicate via a control field in the RRC reconfiguration message to use antenna array 205-*f* for performing initial access. Alternatively, UE 115-*c* may select antenna array 205-*f* and may indicate that UE 115-*c* is to use antenna array 205-*f* in the RRC reconfiguration response message. Alternatively, UE 115-*c* may receive a DCI or MAC-CE message from base station 105-*c* that indicates, via a control field, to use antenna array 205-*f* for performing initial access. In some cases, base stations 105-*c* and 105-*d* may be in a dual connectivity configuration.

In another scenario, UE 115-*c* may perform handover from communicating with base station 105-*c* via antenna array 205-*e* to communicating with base station 105-*d* via antenna array 205-*f*. Performing handover may involve transmitting a PRACH to base station 105-*d* using antenna array 205-*f*. In one example, UE 115-*c* may receive an RRC reconfiguration message (e.g., an RRCReconfig message) from base station 105-*c* containing measurement information used in handover. UE 115-*c* may transmit an RRC reconfiguration response message (e.g., an RRCReconfig- Complete message) to base station 105-*c* in response to receiving the RRC reconfiguration message. Base station 105-*c* may indicate for the UE 115-*c* to use antenna array 205-*f* for performing initial access via a control field in the RRC reconfiguration message. Alternatively, UE 115-*c* may select antenna array 205-*f* and may indicate that UE 115-*c* is to use antenna array 205-*f* in the RRC reconfiguration response message. Alternatively, UE 115-*c* may receive a DCI or MAC-CE message from base station 105-*c* that indicates, via a control field, to use antenna array 205-*f* for performing initial access.

Figure 5:
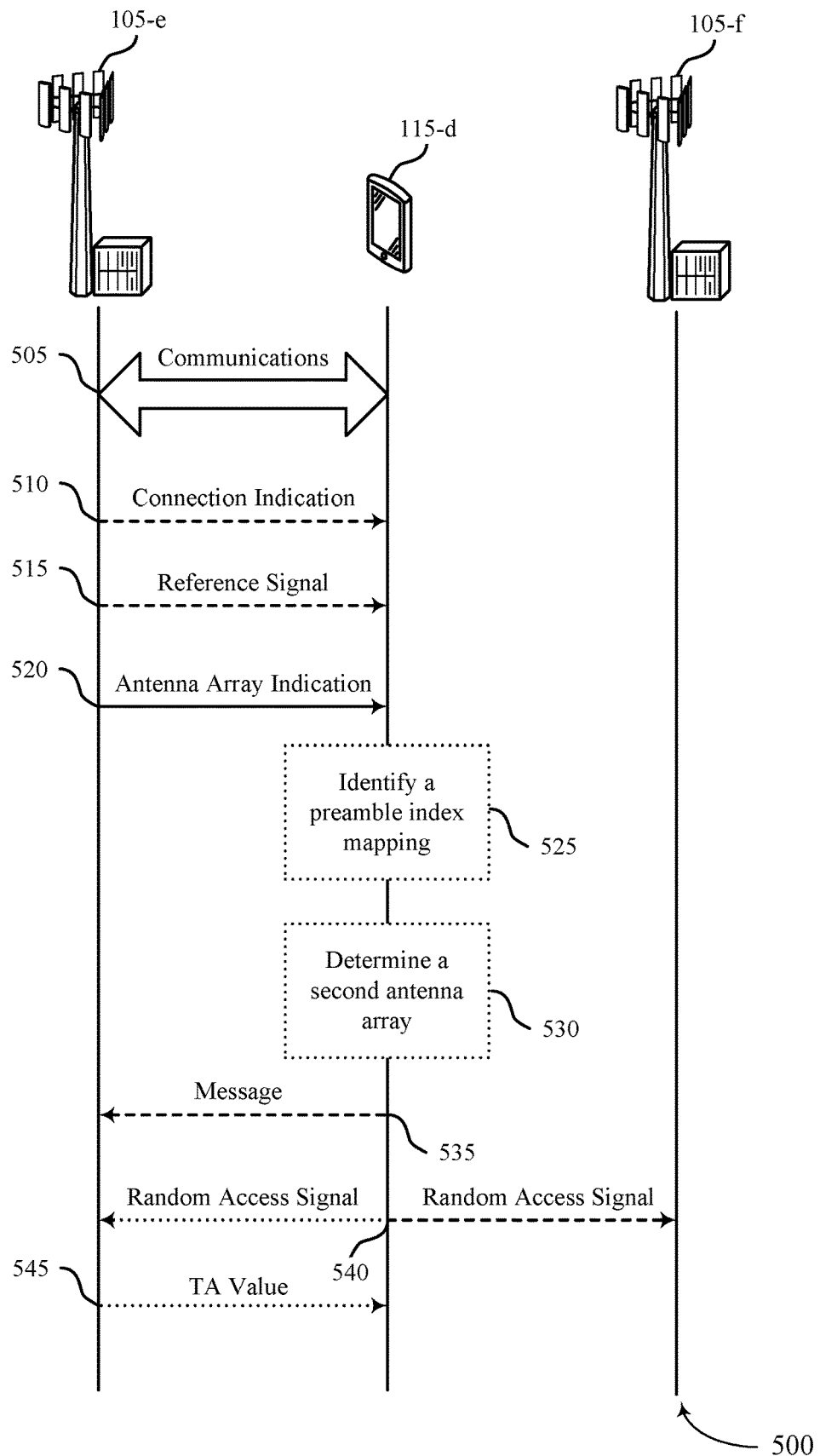
FIG. 5 illustrates an example of a process flow that supports multi-panel control channel order, initial access, and handover in accordance with aspects of the present disclosure.

FIG. 5 illustrates an example of a process flow 500 that supports multi-panel control channel order, initial access, and handover in accordance with aspects of the present disclosure. In some examples, process flow 500 may implement aspects of wireless communications system 100. For instance, process flow may be implemented by UE 115-*d*, base station 105-*e*, and base station 105-*f*, which may be examples of a UE 115 and base stations 105 as described with reference to FIG. 1.

At 505, base station 105-*e* may communicate with UE 115-*d*. UE 115-*d* may communicate with base station 105-*e* using a first antenna array of a set of antenna arrays. Each antenna array of the set of antenna arrays may be associated with a different one of a set of antenna modules of UE 115-*d*.

At 510, base station 105-*e* may transmit a signal or message indicating that UE 115-*d* is to establish a connection with base station 105-*f*. UE 115-*d* may receive the signal or message.

At 515, base station 105-*e* may transmit a downlink reference signal (e.g., an SSB) associated with a second antenna array of the set of antenna arrays. UE 115-*d* may receive the downlink reference signal. In other examples, the order of 510 and 515 may be switched.

At 520, base station 105-*e* may transmit an indication that UE 115-*d* is to use a second antenna array of the set of antenna arrays to transmit a random access signal. In one example, base station 105-*e* may transmit a control channel order including DCI corresponding to the indication of the second antenna array. In another example, base station 105-*e* may transmit a signal (e.g., MAC-CE or DCI) indicating the second antenna array. In some cases, 510 and 520 may be combined (e.g., the signal or message indicating that UE 115-*d* is to establish a connection with base station 105-*f* may also include an indication that UE 115-*d* is to use a second antenna array of the set of antenna arrays to transmit a random access signal). UE 115-*d* may receive the indication.

At 525, UE 115-*d* may identify a mapping between a set of preamble indices (e.g., of a random access preamble, such as a RACH preamble) and one or more of the set of antenna arrays. The mapping may be preconfigured at UE 115-*d* or may be configured while UE 115-*d* is communicating with base station 105-*e* (e.g., at 505). When configured by base station 105-*e*, the mapping may be configured via semi-static signaling (e.g., RRC) or dynamic signaling (e.g., DCI or MAC-CE). Configuring the mapping while UE 115-*d* is communicating with base station 105-*e* may ensure that a mapping of the preamble index at base station 105-*e* is the same as a mapping of the preamble index at UE 115-*d*. In other examples, 525 may occur prior to 510.

At 530, UE 115-*d* may determine the second antenna array to use to transmit the random access signal. UE 115-*d* may determine the second antenna array based on the preamble index and the identified mapping at 520. Additionally or alternatively, UE 115-*d* may determine the second antenna array based on the received downlink reference signal being associated with the second antenna array.

At 535, UE 115-*d* may transmit a message (e.g., an RRC reconfiguration complete message) indicating the second antenna array that UE 115-*d* is to use to establish the connection with the base station 105-*f*. Base station 105-*e* may receive the message.

At 540, UE 115-*d* may transmit, to base station 105-*e* or base station 105-*f*, the random access signal (e.g., a PRACH) using the second antenna array. If the random access signal is transmitted to base station 105-*f*, the random access signal may be transmitted as part of a handover procedure or an initial access procedure. If the random access signal is transmitted as part of an initial access procedure, base station 105-*e* may be a primary base station 105 of a dual connectivity configuration (e.g., the master base station, MgNB) and base station 105-*f* may be a secondary base station of a dual connectivity configuration (e.g., a secondary base station, SgNB). If the random access signal is transmitted as part of a handover procedure, base station 105-*e* may be a source base station 105 and base station 105-*f* may be a target base station 105. UE 115-*d* may transmit the random access signal based on the signal or message at 510, the indication at 520, or a combination thereof. Base station 105-*e*, or base station 105-*f* may receive the random access signal, or both.

At 545, base station 105-*e* may transmit a TA value (e.g., via a RAR). UE 115-*d* may receive the TA value.

Figure 6:
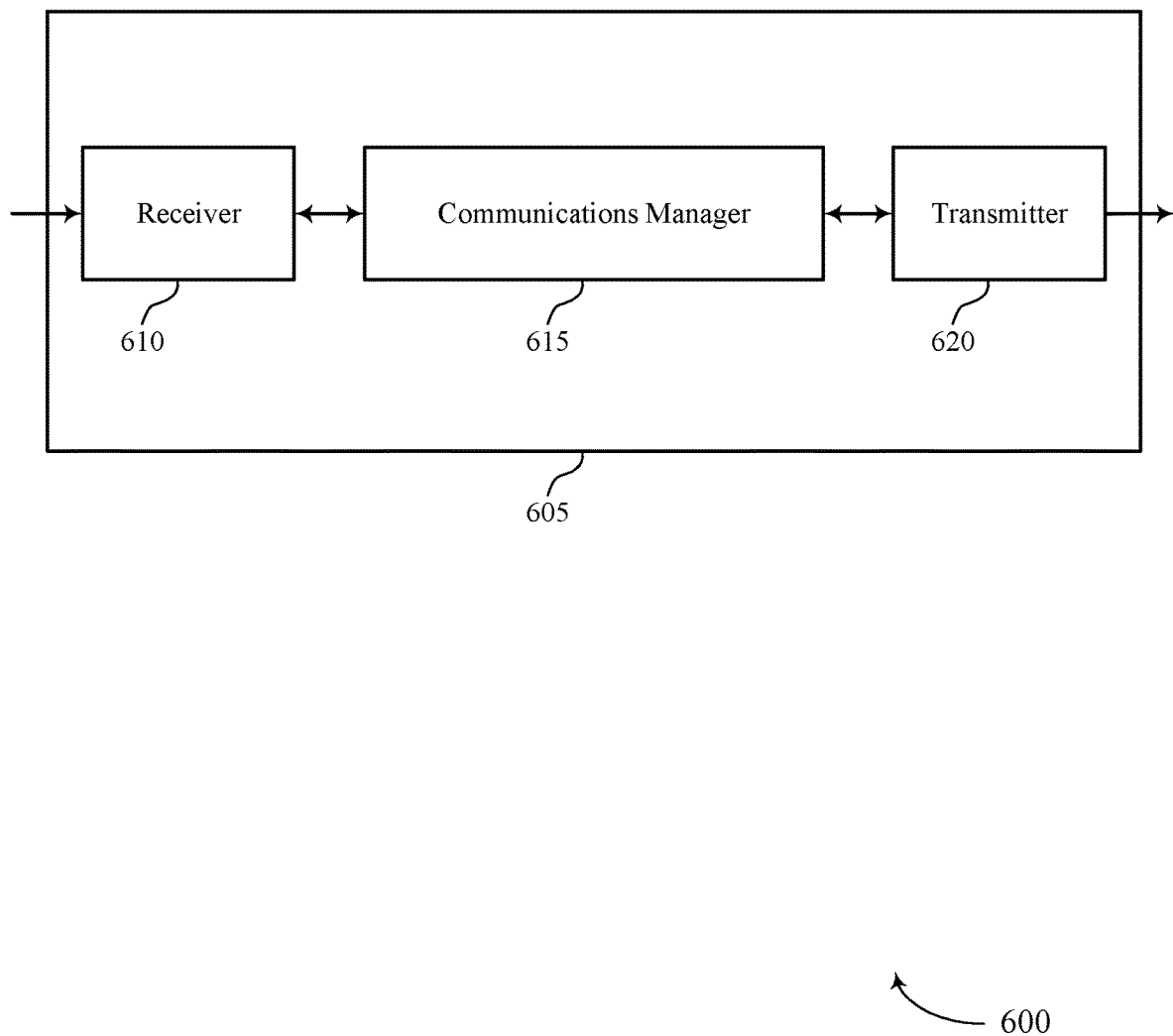
FIGS. 6 and 7 show block diagrams of devices that support multi-panel control channel order, initial access, and handover in accordance with aspects of the present disclosure.

FIG. 6 shows a block diagram 600 of a device 605 that supports multi-panel control channel order, initial access, and handover in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multi-panel control channel order, initial access, and handover, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate with a first base station using a first antenna array of a set of antenna arrays of the UE, receive, from the first base station, an indication that the UE is to use a second antenna array of the set of antenna arrays to transmit a random access signal, and transmit, to the first base station or a second base station, the random access signal using the second antenna array based on the received indication. The communications manager 615 may be an example of aspects of the communications manager 910 described herein. The actions performed by communications manager 615 may be implemented to realize one or more potential advantages. For instance, using multiple antenna arrays to communicate with base stations may enable received signals to be received at a higher SNR, RSRP, or SINR than if using a single panel. Receiving signals at a higher SNR, RSRP, or SINR may enable the signals to be decoded more easily or may enable communications manager 615 to operate with less sensitivity.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
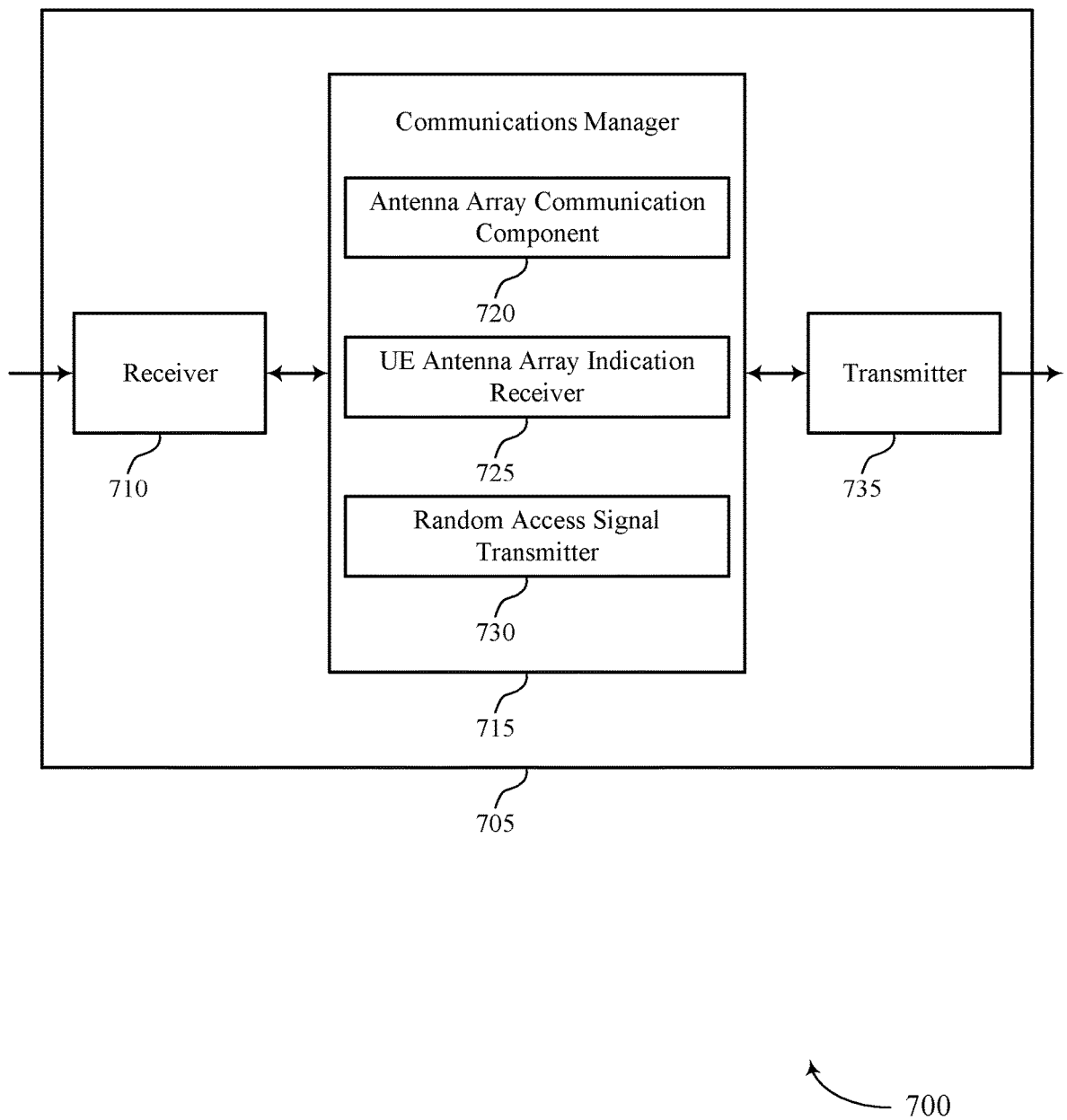

FIG. 7 shows a block diagram 700 of a device 705 that supports multi-panel control channel order, initial access, and handover in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to multi-panel control channel order, initial access, and handover, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an antenna array communication component 720, an UE antenna array indication receiver 725, and a random access signal transmitter 730. The communications manager 715 may be an example of aspects of the communications manager 910 described herein.

The antenna array communication component 720 may communicate with a first base station using a first antenna array of a set of antenna arrays of the UE.

The UE antenna array indication receiver 725 may receive, from the first base station, an indication that the UE is to use a second antenna array of the set of antenna arrays to transmit a random access signal.

The random access signal transmitter 730 may transmit, to the first base station or a second base station, the random access signal using the second antenna array based on the received indication.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
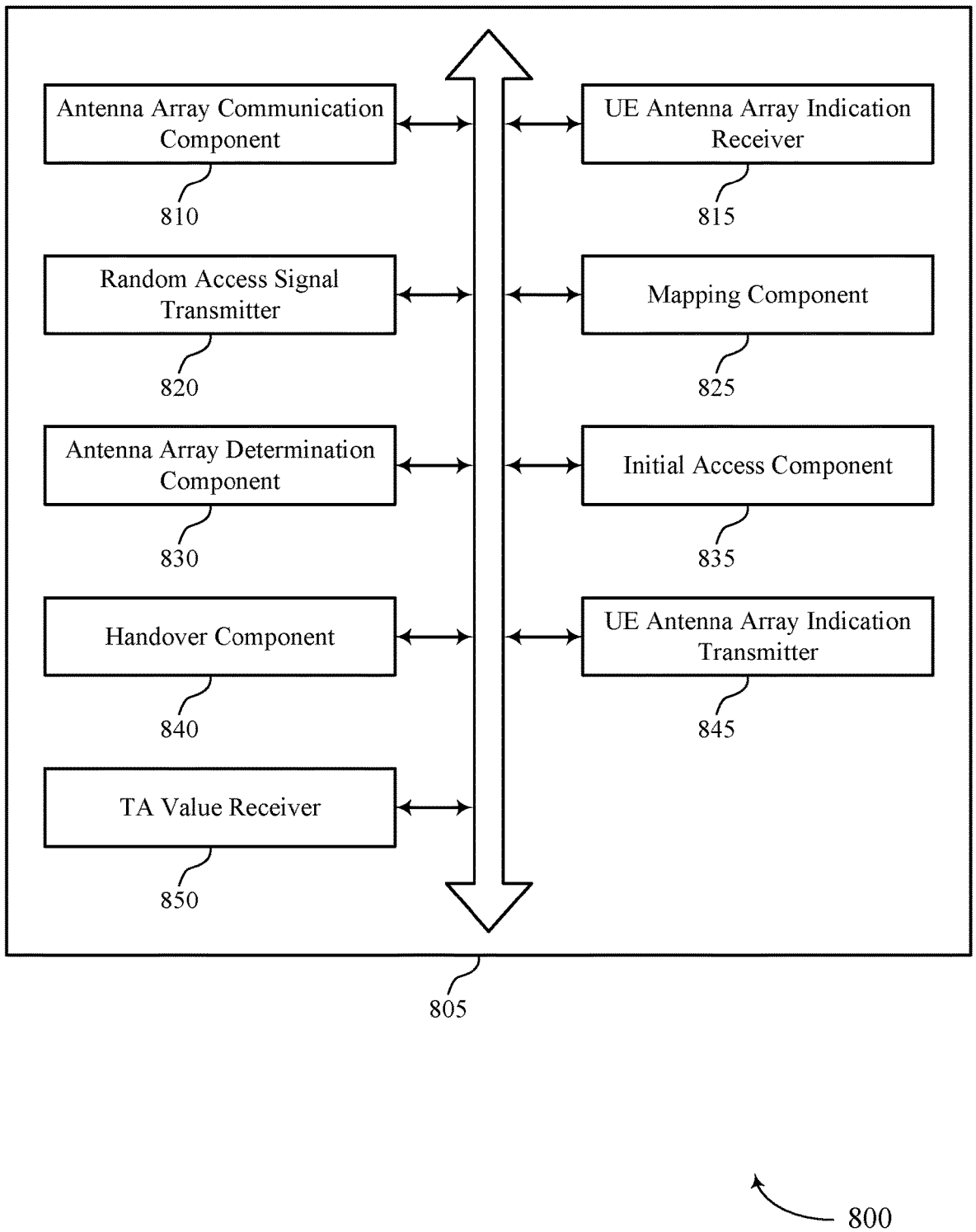
FIG. 8 shows a block diagram of a communications manager that supports multi-panel control channel order, initial access, and handover in accordance with aspects of the present disclosure.

FIG. 8 shows a block diagram 800 of a communications manager 805 that supports multi-panel control channel order, initial access, and handover in accordance with aspects of the present disclosure. The communications manager 805 may be an example of aspects of a communications manager 615, a communications manager 715, or a communications manager 910 described herein. The communications manager 805 may include an antenna array communication component 810, an UE antenna array indication receiver 815, a random access signal transmitter 820, a mapping component 825, an antenna array determination component 830, an initial access component 835, a handover component 840, an UE antenna array indication transmitter 845, and a TA value receiver 850. Each of these modules may communicate, directly or indirectly, with one another (e.g., via one or more buses).

The antenna array communication component 810 may communicate with a first base station using a first antenna array of a set of antenna arrays of the UE. In some cases, each antenna array of the set of antenna arrays are associated with a different one of a set of antenna modules of the UE.

The UE antenna array indication receiver 815 may receive, from the first base station, an indication that the UE is to use a second antenna array of the set of antenna arrays to transmit a random access signal. In some examples, receiving a control channel order that includes the indication that the UE is to use the second antenna array to transmit the random access signal. In some examples, the UE antenna array indication receiver 815 may receive a downlink control information indicating the second antenna array. In some examples, receiving, before receiving the control channel order that includes the indication, a downlink reference signal associated with the second antenna array. In some examples, receiving the indication includes receiving, from the first base station, a signal indicating that the UE is to establish a connection with the second base station, the received signal indicating the second antenna array. In some examples, receiving the indication includes receiving, from the first base station, a first message indicating that the UE is to establish the connection with the second base station. In some examples, receiving the indication includes receiving, from the first base station, a first signal indicating that the UE is to establish the connection with the second base station; and receiving, from the first base station, a second signal indicating the second antenna array. In some cases, the received signal includes a radio resource control reconfiguration message, or a MAC control element (CE), or a downlink control information. In some cases, the received first message includes a radio resource control reconfiguration message. In some cases, the first signal includes a radio resource control reconfiguration message.

The random access signal transmitter 820 may transmit, to the first base station or a second base station, the random access signal using the second antenna array based on the received indication. In some examples, transmitting the random access signal includes transmitting the random access signal to the second base station using the second antenna array based on the received signal. In some examples, transmitting the random access signal includes transmitting the random access signal to the second base station using the second antenna array based on the transmitted second message. In some examples, transmitting the random access signal includes transmitting the random access signal to the second base station using the second antenna array based on the received signal. In some cases, the second signal includes a MAC control element (CE) or a downlink control information indicating the second antenna array.

The mapping component 825 may identify a mapping between a set of preamble indices and a set of antenna arrays.

The antenna array determination component 830 may determine the second antenna array to use transmit the random access signal based on the preamble index and the identified mapping. In some examples, the antenna array determination component 830 may determine to use the second antenna array to transmit the random access signal based on the received downlink reference signal being associated with the second antenna array.

The initial access component 835 may perform, using the second antenna array indicated by the received signal, an initial access procedure with the second base station, where the transmitted random access signal is a part of the initial access procedure, the first base station is a primary base station of a dual connectivity configuration, and the second base station is a secondary base station of the dual connectivity configuration. In some examples, the initial access component 835 may perform, using the second antenna array indicated by the transmitted second message, an initial access procedure with the second base station, where the transmitted random access signal is a part of the initial access procedure, the first base station is a primary base station of a dual connectivity configuration, and the second base station is a secondary base station of the dual connectivity configuration.

The handover component 840 may perform, using the second antenna array indicated by the received signal, a handover procedure from the first base station to the second base station, where the transmitted random access signal is a part of the handover procedure, the first base station is a source base station of the handover procedure, and the second base station is a target base station of the handover procedure. In some examples, the handover component 840 may perform, using the second antenna array indicated by the transmitted second message, a handover procedure from the first base station to the second base station, where the transmitted random access signal is a part of the handover procedure, the first base station is a source base station of the handover procedure, and the second base station is a target base station of the handover procedure.

The UE antenna array indication transmitter 845 may transmit, to the first base station, a second message indicating the second antenna array that the UE is to use to establish the connection with the second base station. In some cases, the transmitted second message includes a radio resource control reconfiguration complete message.

The TA value receiver 850 may receive, from the first base station in response to the transmitted random access signal, a timing advance value for the second antenna array.

Figure 9:
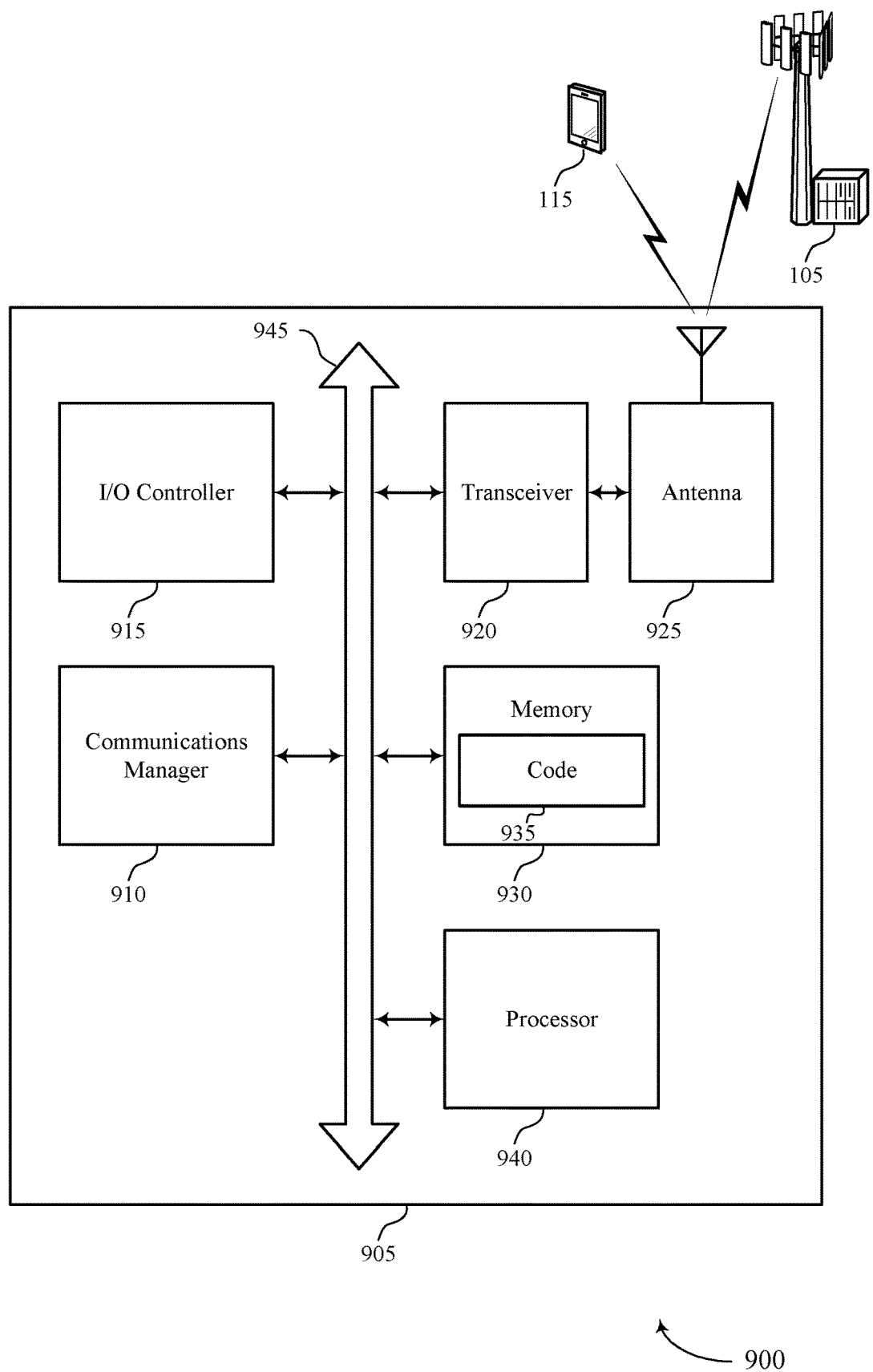
FIG. 9 shows a diagram of a system including a device that supports multi-panel control channel order, initial access, and handover in accordance with aspects of the present disclosure.

FIG. 9 shows a diagram of a system 900 including a device 905 that supports multi-panel control channel order, initial access, and handover in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may communicate with a first base station using a first antenna array of a set of antenna arrays of the UE, receive, from the first base station, an indication that the UE is to use a second antenna array of the set of antenna arrays to transmit a random access signal, and transmit, to the first base station or a second base station, the random access signal using the second antenna array based on the received indication.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting multi-panel control channel order, initial access, and handover).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
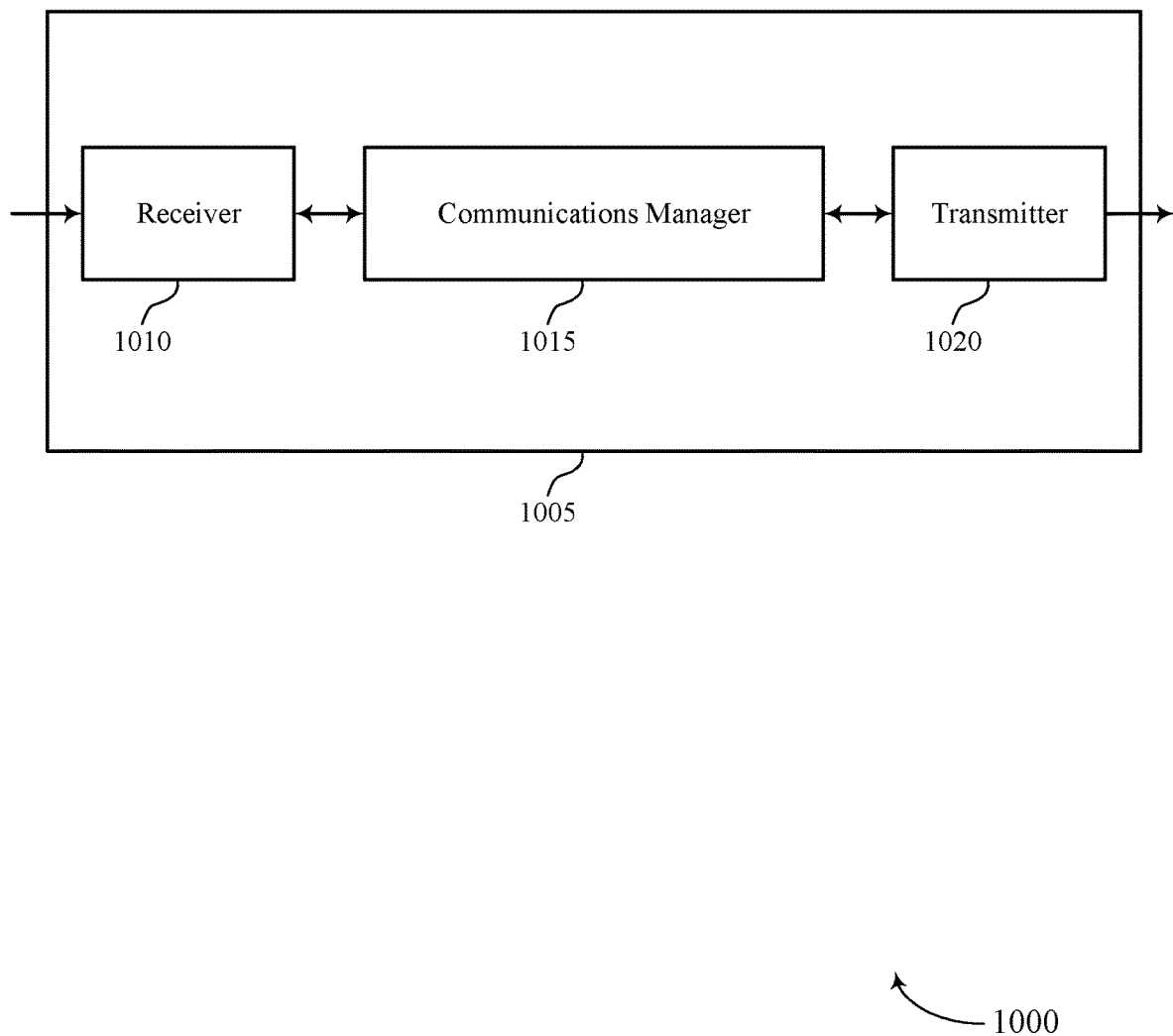
FIGS. 10 and 11 show block diagrams of devices that support multi-panel control channel order, initial access, and handover in accordance with aspects of the present disclosure.

FIG. 10 shows a block diagram 1000 of a device 1005 that supports multi-panel control channel order, initial access, and handover in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to multi-panel control channel order, initial access, and handover, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may communicate with a UE, identify a set of antenna arrays of the UE, the set of antenna arrays including at least a first antenna array used to communicate with the first base station and a second antenna array, and transmit, to the UE, an indication that the UE is to use the second antenna array to transmit a random access signal to the first base station or a second base station. The communications manager 1015 may be an example of aspects of the communications manager 1310 described herein. The actions performed by communications manager 1015 may be implemented to realize one or more potential advantages. For instance, indicating which antenna array the UE is to use for transmitting random access signals may enable increased control by the network.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
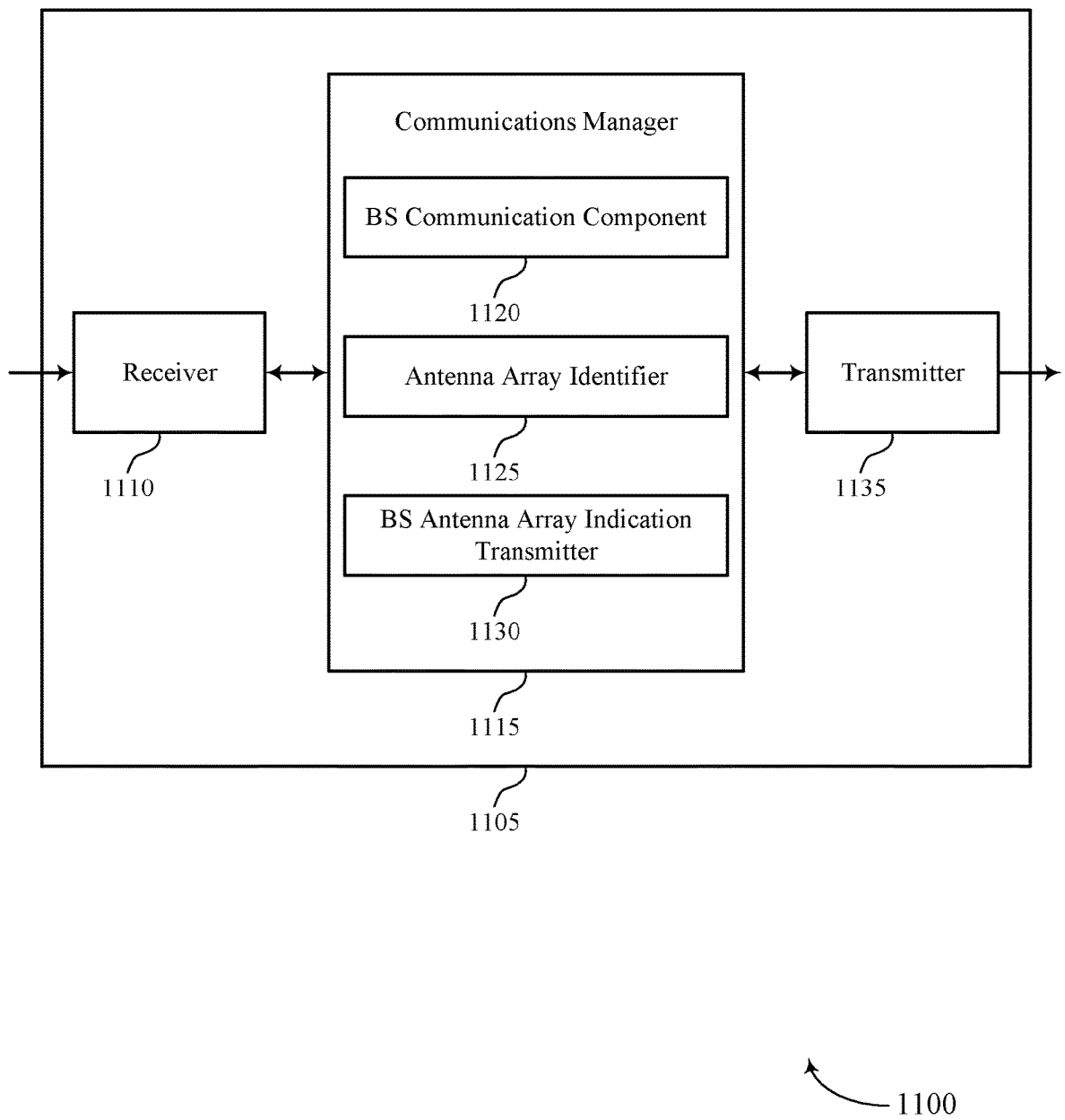

FIG. 11 shows a block diagram 1100 of a device 1105 that supports multi-panel control channel order, initial access, and handover in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to multi-panel control channel order, initial access, and handover, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a BS communication component 1120, an antenna array identifier 1125, and a BS antenna array indication transmitter 1130. The communications manager 1115 may be an example of aspects of the communications manager 1310 described herein.

The BS communication component 1120 may communicate with a UE.

The antenna array identifier 1125 may identify a set of antenna arrays of the UE, the set of antenna arrays including at least a first antenna array used to communicate with the first base station and a second antenna array.

The BS antenna array indication transmitter 1130 may transmit, to the UE, an indication that the UE is to use the second antenna array to transmit a random access signal to the first base station or a second base station.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
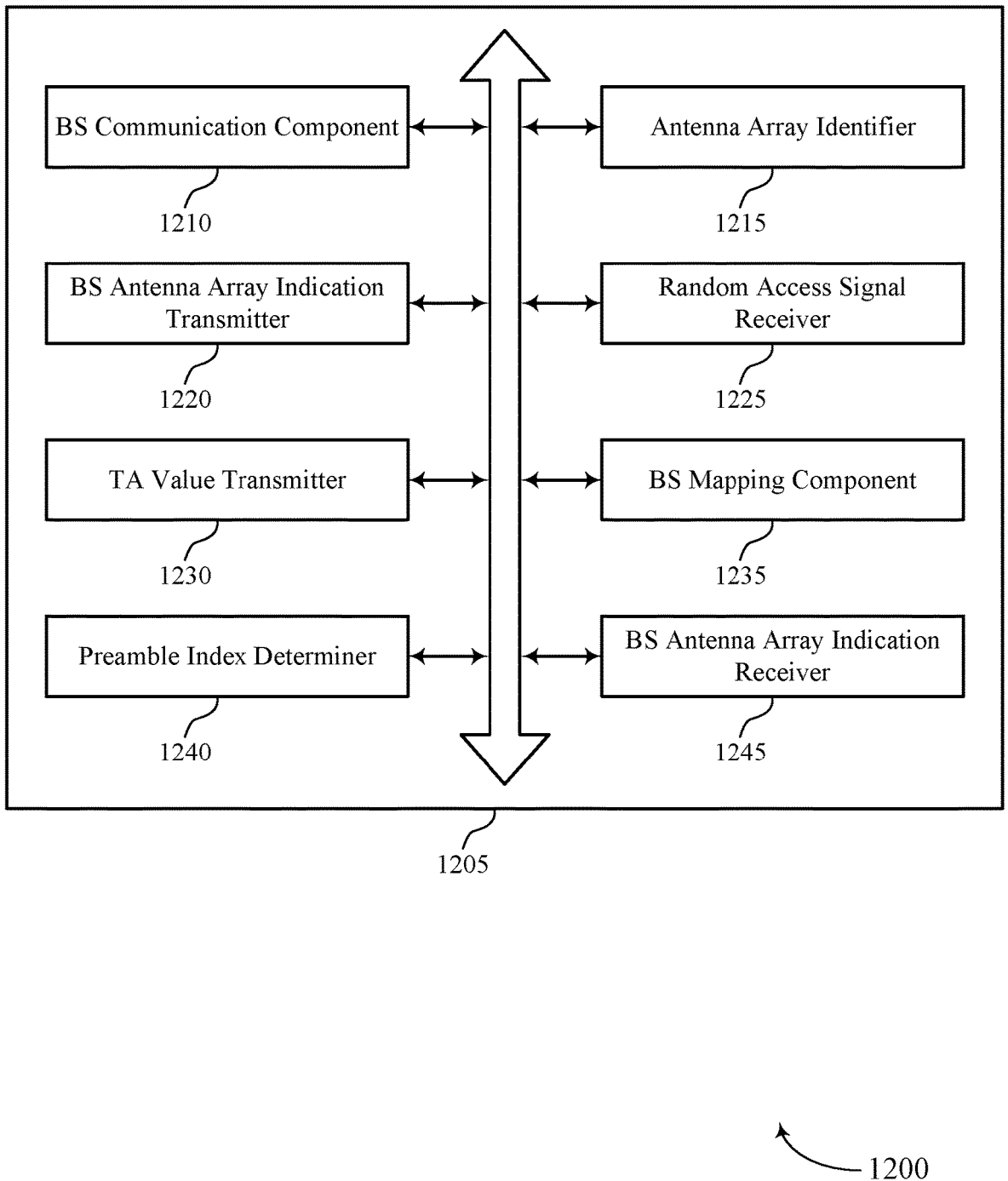
FIG. 12 shows a block diagram of a communications manager that supports multi-panel control channel order, initial access, and handover in accordance with aspects of the present disclosure.

FIG. 12 shows a block diagram 1200 of a communications manager 1205 that supports multi-panel control channel order, initial access, and handover in accordance with aspects of the present disclosure. The communications manager 1205 may be an example of aspects of a communications manager 1015, a communications manager 1115, or a communications manager 1310 described herein. The communications manager 1205 may include a BS communication component 1210, an antenna array identifier 1215, a BS antenna array indication transmitter 1220, a random access signal receiver 1225, a TA value transmitter 1230, a BS mapping component 1235, a preamble index determiner 1240, and a BS antenna array indication receiver 1245. Each of these modules may communicate, directly or indirectly, with one another (e.g., via one or more buses).

The BS communication component 1210 may communicate with a UE. In some examples, the BS communication component 1210 may transmit, to the UE, a first signal indicating that the UE is to establish a connection with the second base station. In some cases, the first signal includes a radio resource control reconfiguration message.

The antenna array identifier 1215 may identify a set of antenna arrays of the UE, the set of antenna arrays including at least a first antenna array used to communicate with the first base station and a second antenna array.

The BS antenna array indication transmitter 1220 may transmit, to the UE, an indication that the UE is to use the second antenna array to transmit a random access signal to the first base station or a second base station. In some examples, transmitting a control channel order that includes the indication that the UE is to use the second antenna array to transmit the random access signal. In some examples, the BS antenna array indication transmitter 1220 may transmit a downlink control information indicating the second antenna array. In some examples, transmitting, before transmitting the control channel order that includes the indication, a downlink reference signal associated with the second antenna array, the UE to use the second antenna array to transmit the random access signal based on the downlink reference signal being associated with the second antenna array. In some examples, transmitting the indication includes transmitting a signal indicating that the UE is to establish a connection with the second base station, the transmitted signal indicating the second antenna array. In some examples, transmitting the indication includes transmitting, to the UE, a first message indicating that the UE is to establish a connection with the second base station. In some examples, the BS antenna array indication transmitter 1220 may transmit, to the UE, a second signal indicating the second antenna array. In some cases, the signal indicating that the UE is to establish the connection with the second base station includes a request for the UE to perform an initial access procedure with the second base station, where the first base station is a primary base station of a dual connectivity configuration, and the second base station is a secondary base station of the dual connectivity configuration. In some cases, the signal indicating that the UE is to establish the connection with the second base station includes a request for the UE to perform a handover procedure to the second base station, where the first base station is a source base station of the handover procedure, and the second base station is a target base station of the handover procedure. In some cases, the transmitted signal includes a radio resource control reconfiguration message, or a MAC control element (CE), or a downlink control information. In some cases, the transmitted first message includes a radio resource control reconfiguration message. In some cases, the second signal includes a MAC control element (CE) or a downlink control information indicating the second antenna array.

The random access signal receiver 1225 may receive, from the UE based on the transmitted indication, the random access signal.

The TA value transmitter 1230 may transmit, to the UE in response to the received random access signal, a timing advance value for the second antenna array.

The BS mapping component 1235 may identify a mapping between a set of preamble indices and a set of antenna arrays of the UE.

The preamble index determiner 1240 may determine a preamble index corresponding to the second antenna array that the UE is to use to transmit the random access signal, where the transmitted indication includes the determined preamble index.

The BS antenna array indication receiver 1245 may receive, from the UE, a second message indicating the second antenna array that the UE is to use to establish the connection with the second base station. In some cases, the second message indicates that the UE is to perform an initial access procedure with the second base station. In some cases, the second message indicates that the UE is to perform a handover procedure with the second base station. In some cases, the received second message includes a radio resource control reconfiguration complete message.

Figure 13:
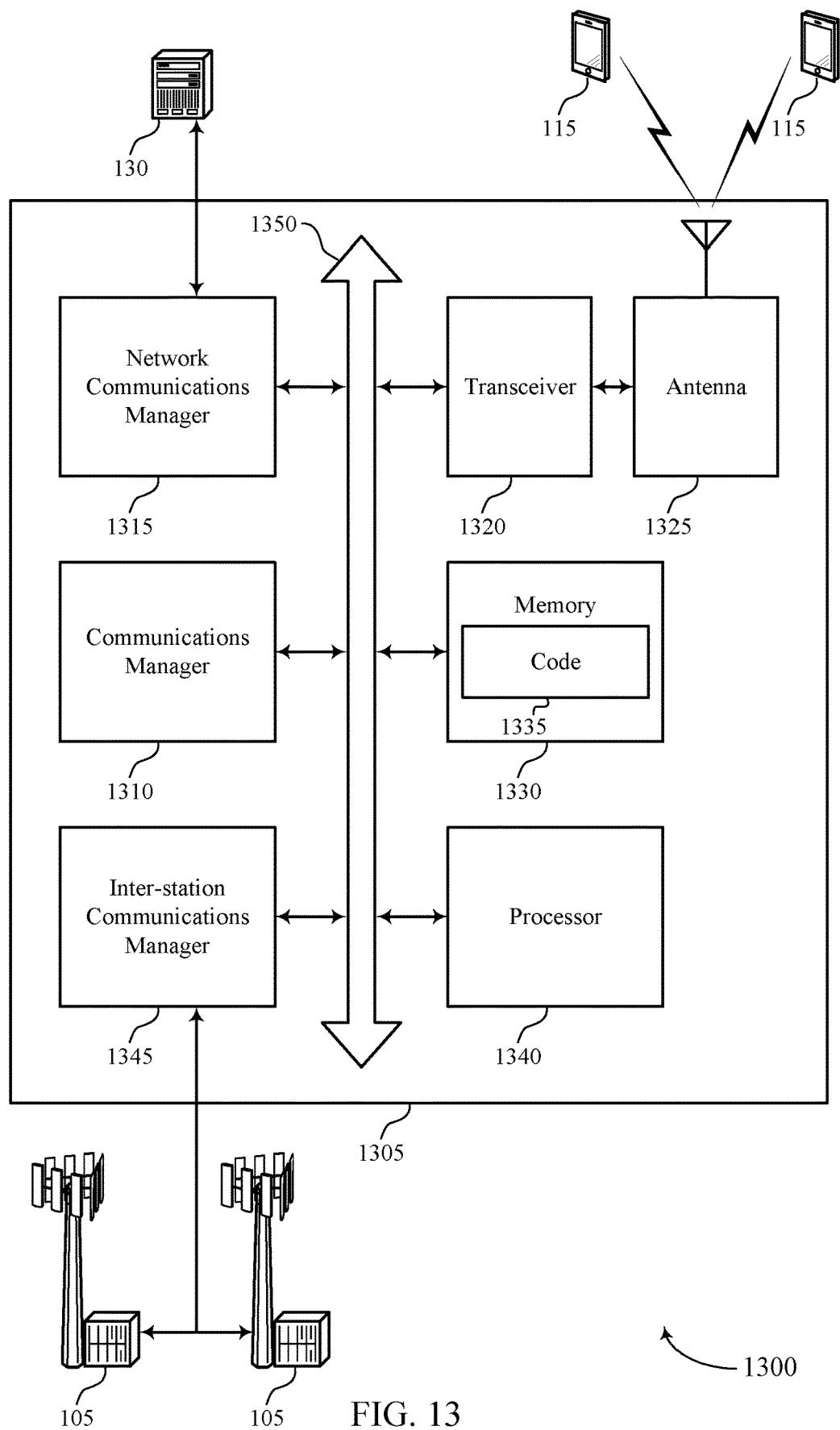
FIG. 13 shows a diagram of a system including a device that supports multi-panel control channel order, initial access, and handover in accordance with aspects of the present disclosure.

FIG. 13 shows a diagram of a system 1300 including a device 1305 that supports multi-panel control channel order, initial access, and handover in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may communicate with a UE, identify a set of antenna arrays of the UE, the set of antenna arrays including at least a first antenna array used to communicate with the first base station and a second antenna array, and transmit, to the UE, an indication that the UE is to use the second antenna array to transmit a random access signal to the first base station or a second base station.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting multi-panel control channel order, initial access, and handover).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
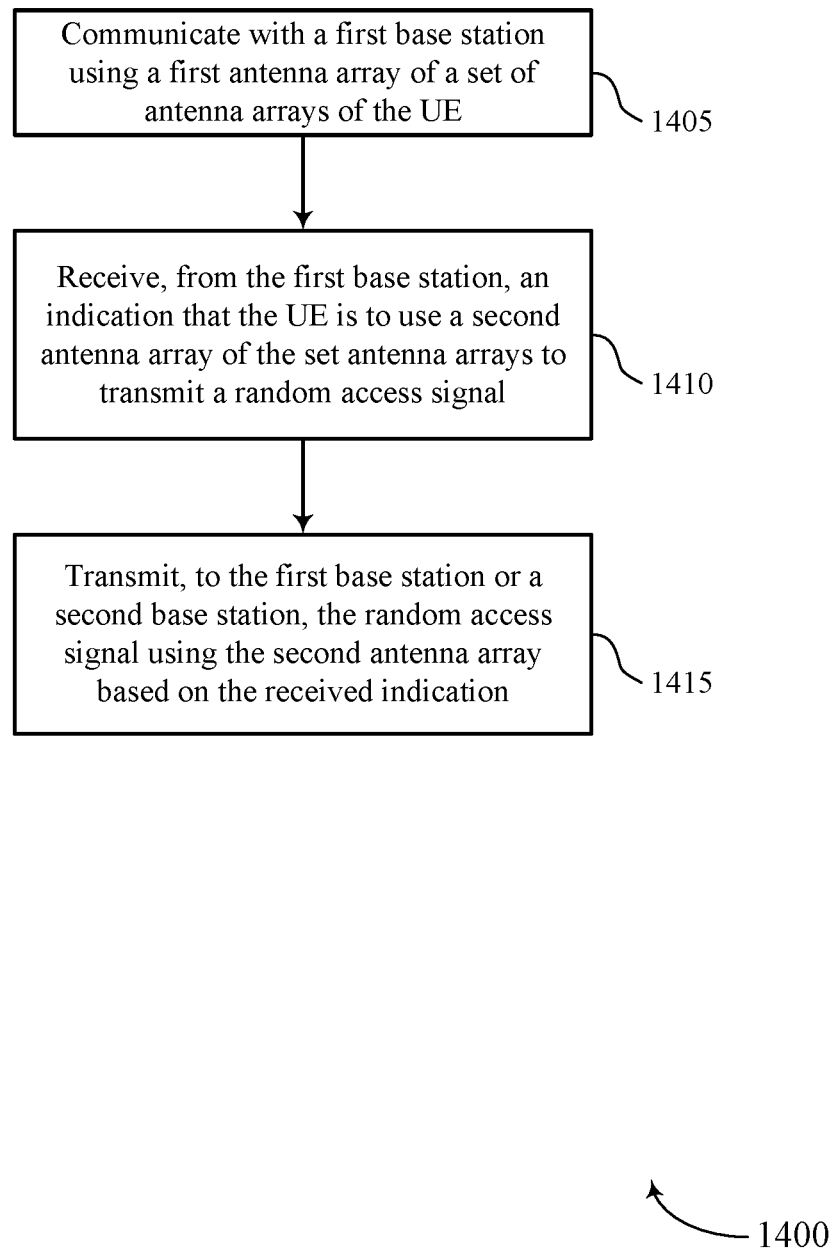
FIGS. 14 through 20 show flowcharts illustrating methods that support multi-panel control channel order, initial access, and handover in accordance with aspects of the present disclosure.

FIG. 14 shows a flowchart illustrating a method 1400 that supports multi-panel control channel order, initial access, and handover in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may communicate with a first base station using a first antenna array of a set of antenna arrays of the UE. The operations of 1405 may be performed according to the methods described herein. In some examples, aspects of the operations of 1405 may be performed by an antenna array communication component as described with reference to FIGS. 6 through 9.

At 1410, the UE may receive, from the first base station, an indication that the UE is to use a second antenna array of the set of antenna arrays to transmit a random access signal. The operations of 1410 may be performed according to the methods described herein. In some examples, aspects of the operations of 1410 may be performed by an UE antenna array indication receiver as described with reference to FIGS. 6 through 9.

At 1415, the UE may transmit, to the first base station or a second base station, the random access signal using the second antenna array based on the received indication. The operations of 1415 may be performed according to the methods described herein. In some examples, aspects of the operations of 1415 may be performed by a random access signal transmitter as described with reference to FIGS. 6 through 9.

Figure 15:
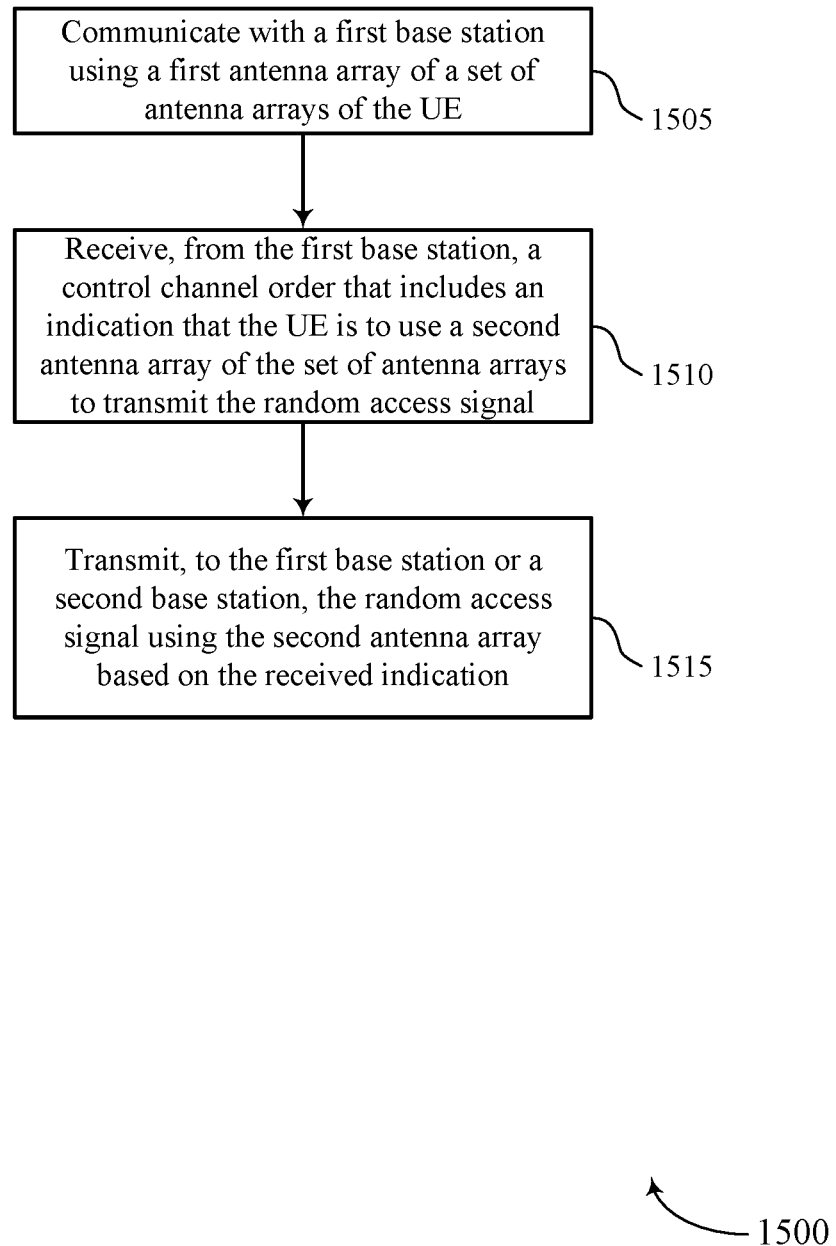

FIG. 15 shows a flowchart illustrating a method 1500 that supports multi-panel control channel order, initial access, and handover in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may communicate with a first base station using a first antenna array of a set of antenna arrays of the UE. The operations of 1505 may be performed according to the methods described herein. In some examples, aspects of the operations of 1505 may be performed by an antenna array communication component as described with reference to FIGS. 6 through 9.

At 1510, the UE may receive, from the first base station, a control channel order that includes an indication that the UE is to use a second antenna array of the set of antenna arrays to transmit the random access signal. The operations of 1510 may be performed according to the methods described herein. In some examples, aspects of the operations of 1510 may be performed by an UE antenna array indication receiver as described with reference to FIGS. 6 through 9.

At 1515, the UE may transmit, to the first base station or a second base station, the random access signal using the second antenna array based on the received indication. The operations of 1515 may be performed according to the methods described herein. In some examples, aspects of the operations of 1515 may be performed by a random access signal transmitter as described with reference to FIGS. 6 through 9.

Figure 16:
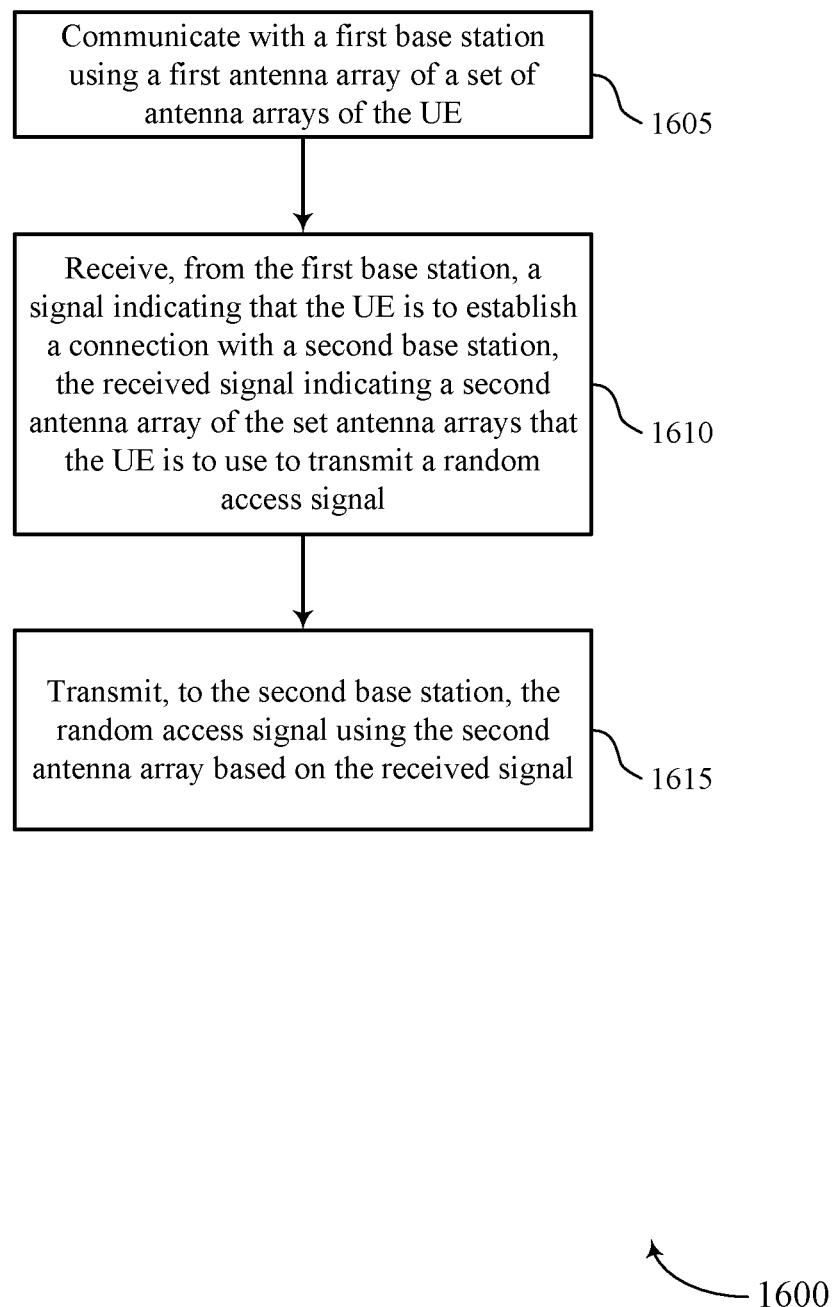

FIG. 16 shows a flowchart illustrating a method 1600 that supports multi-panel control channel order, initial access, and handover in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may communicate with a first base station using a first antenna array of a set of antenna arrays of the UE. The operations of 1605 may be performed according to the methods described herein. In some examples, aspects of the operations of 1605 may be performed by an antenna array communication component as described with reference to FIGS. 6 through 9.

At 1610, the UE may receive, from the first base station, a signal indicating that the UE is to establish a connection with a second base station, the received signal indicating a second antenna array of the set of antenna arrays that the UE is to use to transmit a random access signal. The operations of 1610 may be performed according to the methods described herein. In some examples, aspects of the operations of 1610 may be performed by an UE antenna array indication receiver as described with reference to FIGS. 6 through 9.

At 1615, the UE may transmit, to the second base station, the random access signal using the second antenna array based on the received signal. The operations of 1615 may be performed according to the methods described herein. In some examples, aspects of the operations of 1615 may be performed by a random access signal transmitter as described with reference to FIGS. 6 through 9.

Figure 17:
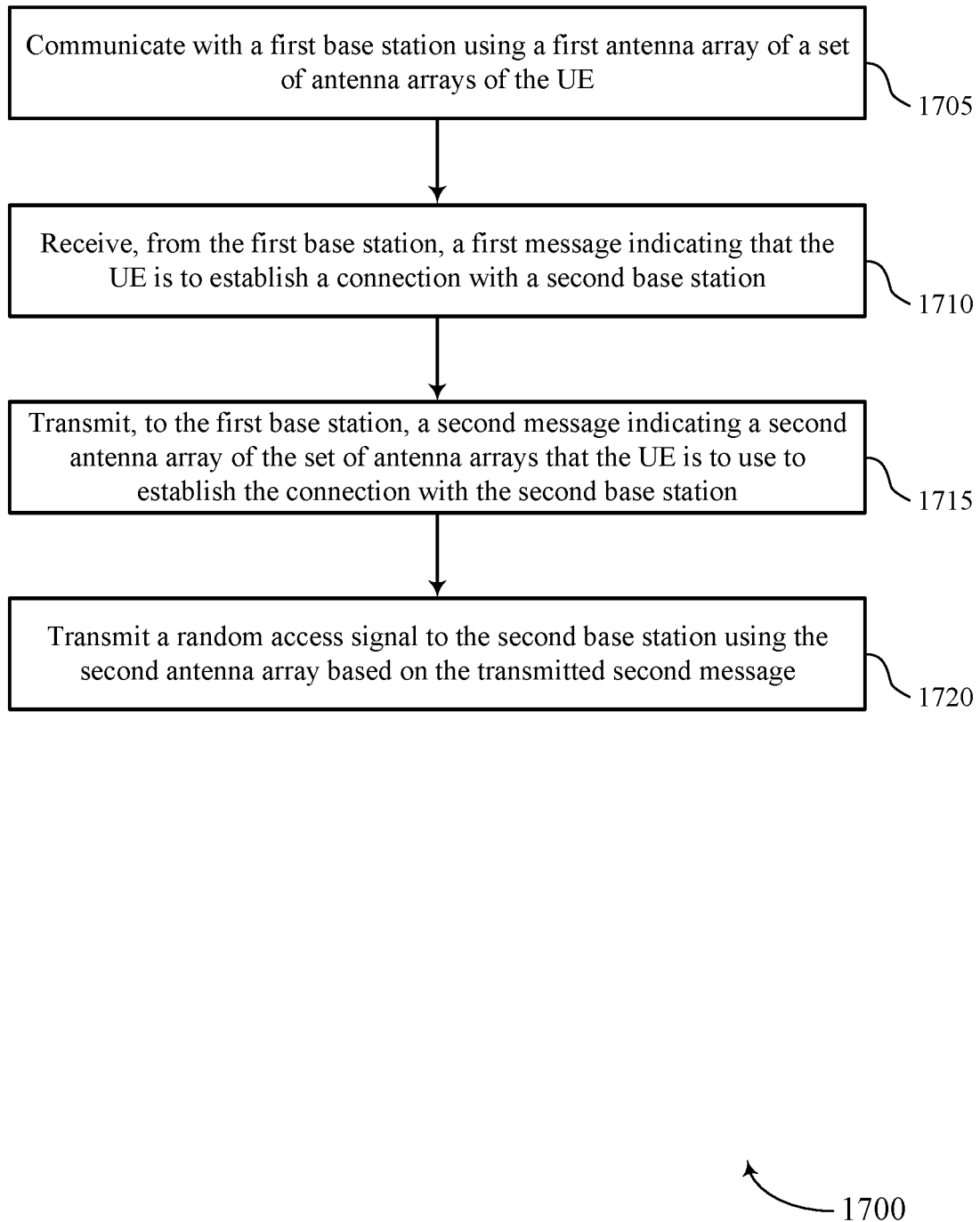

FIG. 17 shows a flowchart illustrating a method 1700 that supports multi-panel control channel order, initial access, and handover in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may communicate with a first base station using a first antenna array of a set of antenna arrays of the UE. The operations of 1705 may be performed according to the methods described herein. In some examples, aspects of the operations of 1705 may be performed by an antenna array communication component as described with reference to FIGS. 6 through 9.

At 1710, the UE may receive, from the first base station, a first message indicating that the UE is to establish a connection with a second base station. The operations of 1710 may be performed according to the methods described herein. In some examples, aspects of the operations of 1710 may be performed by an UE antenna array indication receiver as described with reference to FIGS. 6 through 9.

At 1715, the UE may transmit, to the first base station, a second message indicating a second antenna array of the set of antenna arrays that the UE is to use to establish the connection with the second base station. The operations of 1715 may be performed according to the methods described herein. In some examples, aspects of the operations of 1715 may be performed by an UE antenna array indication transmitter as described with reference to FIGS. 6 through 9.

At 1720, the UE may transmit a random access signal to the second base station using the second antenna array based on the transmitted second message. The operations of 1720 may be performed according to the methods described herein. In some examples, aspects of the operations of 1720 may be performed by a random access signal transmitter as described with reference to FIGS. 6 through 9.

Figure 18:
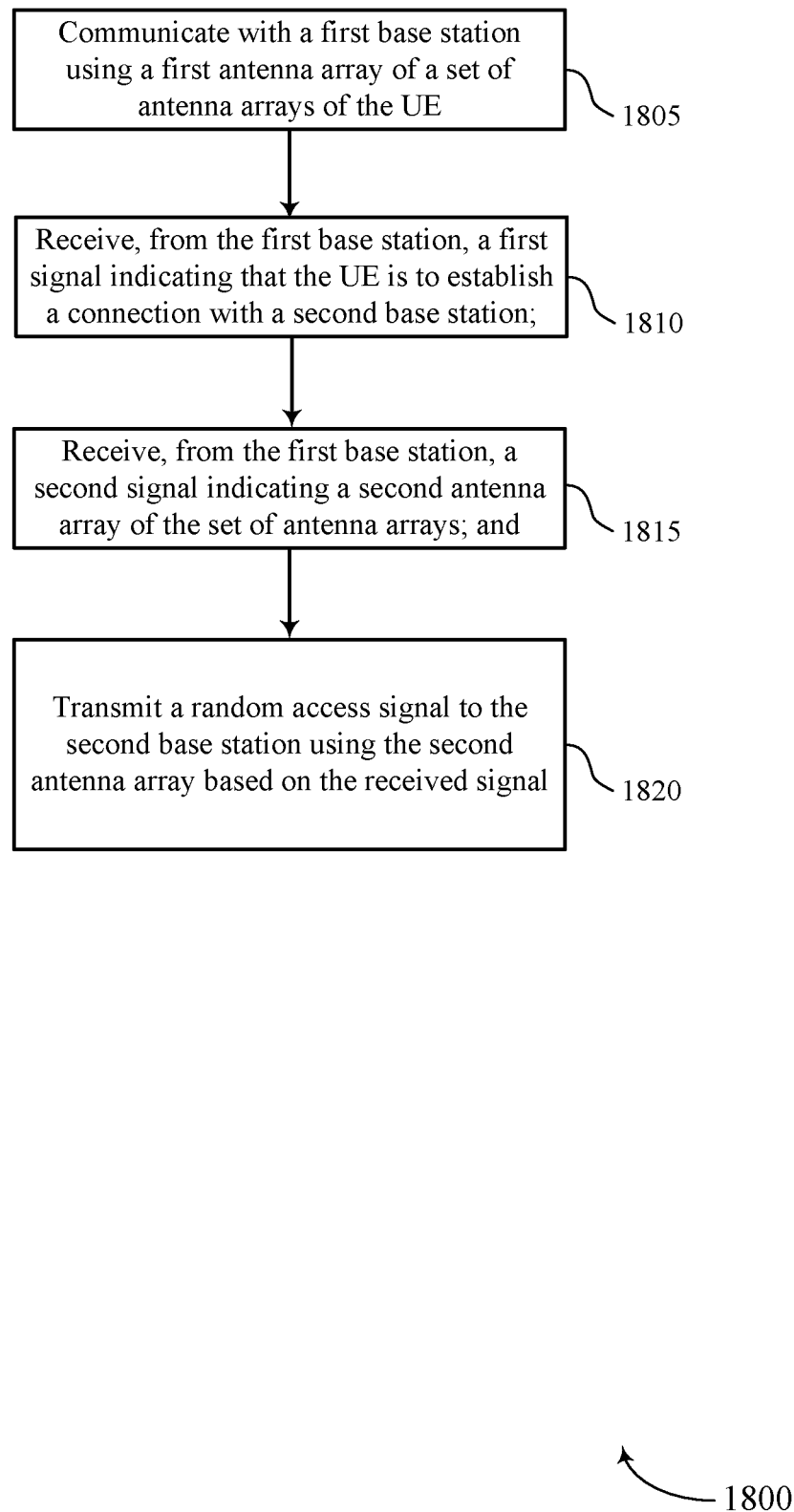

FIG. 18 shows a flowchart illustrating a method 1800 that supports multi-panel control channel order, initial access, and handover in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may communicate with a first base station using a first antenna array of a set of antenna arrays of the UE. The operations of 1805 may be performed according to the methods described herein. In some examples, aspects of the operations of 1805 may be performed by an antenna array communication component as described with reference to FIGS. 6 through 9.

At 1810, the UE may receive, from the first base station, a first signal indicating that the UE is to establish a connection with a second base station. The operations of 1810 may be performed according to the methods described herein. In some examples, aspects of the operations of 1810 may be performed by an UE antenna array indication receiver as described with reference to FIGS. 6 through 9.

At 1815, the UE may receive, from the first base station, a second signal indicating a second antenna array of the set of antenna arrays. The operations of 1815 may be performed according to the methods described herein. In some examples, aspects of the operations of 1815 may be performed by an UE antenna array indication receiver as described with reference to FIGS. 6 through 9.

At 1820, the UE may transmit a random access signal to the second base station using the second antenna array based on the received signal. The operations of 1820 may be performed according to the methods described herein. In some examples, aspects of the operations of 1820 may be performed by a random access signal transmitter as described with reference to FIGS. 6 through 9.

Figure 19:
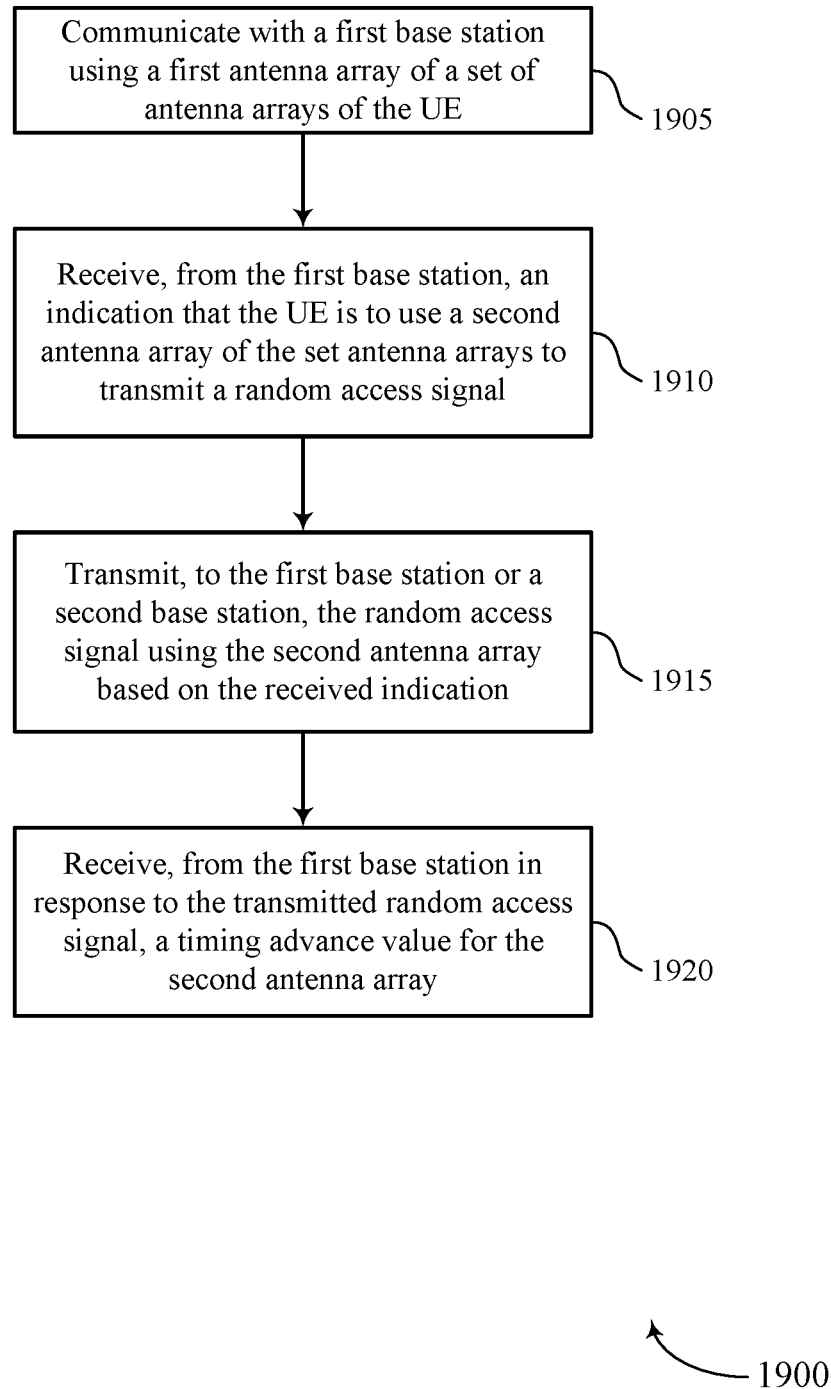

FIG. 19 shows a flowchart illustrating a method 1900 that supports multi-panel control channel order, initial access, and handover in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may communicate with a first base station using a first antenna array of a set of antenna arrays of the UE. The operations of 1905 may be performed according to the methods described herein. In some examples, aspects of the operations of 1905 may be performed by an antenna array communication component as described with reference to FIGS. 6 through 9.

At 1910, the UE may receive, from the first base station, an indication that the UE is to use a second antenna array of the set of antenna arrays to transmit a random access signal. The operations of 1910 may be performed according to the methods described herein. In some examples, aspects of the operations of 1910 may be performed by an UE antenna array indication receiver as described with reference to FIGS. 6 through 9.

At 1915, the UE may transmit, to the first base station or a second base station, the random access signal using the second antenna array based on the received indication. The operations of 1915 may be performed according to the methods described herein. In some examples, aspects of the operations of 1915 may be performed by a random access signal transmitter as described with reference to FIGS. 6 through 9.

At 1920, the UE may receive, from the first base station in response to the transmitted random access signal, a timing advance value for the second antenna array. The operations of 1920 may be performed according to the methods described herein. In some examples, aspects of the operations of 1920 may be performed by a TA value receiver as described with reference to FIGS. 6 through 9.

Figure 20:
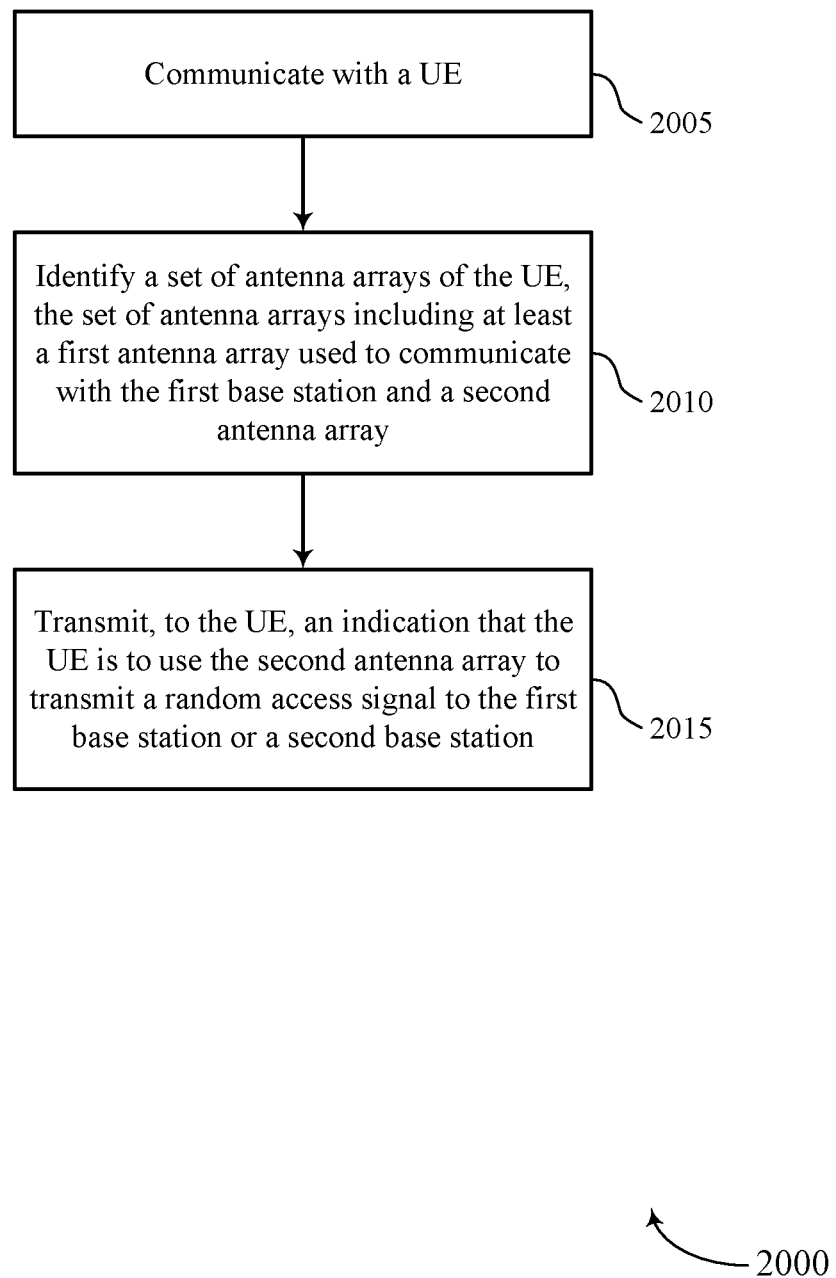

FIG. 20 shows a flowchart illustrating a method 2000 that supports multi-panel control channel order, initial access, and handover in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may communicate with a UE. The operations of 2005 may be performed according to the methods described herein. In some examples, aspects of the operations of 2005 may be performed by a BS communication component as described with reference to FIGS. 10 through 13.

At 2010, the base station may identify a set of antenna arrays of the UE, the set of antenna arrays including at least a first antenna array used to communicate with the first base station and a second antenna array. The operations of 2010 may be performed according to the methods described herein. In some examples, aspects of the operations of 2010 may be performed by an antenna array identifier as described with reference to FIGS. 10 through 13.

At 2015, the base station may transmit, to the UE, an indication that the UE is to use the second antenna array to transmit a random access signal to the first base station or a second base station. The operations of 2015 may be performed according to the methods described herein. In some examples, aspects of the operations of 2015 may be performed by a BS antenna array indication transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    communicating with a first base station using a first antenna array of a plurality of antenna arrays of the UE;
    receiving, from the first base station, an indication that the UE is to use a second antenna array of the plurality of antenna arrays to transmit a random access signal; and
    transmitting, to the first base station or a second base station, the random access signal using the second antenna array based at least in part on the received indication.

2. The method of claim 1, wherein receiving the indication comprises:
    receiving a control channel order that comprises the indication that the UE is to use the second antenna array to transmit the random access signal.

3. The method of claim 2, wherein the received control channel order comprises a preamble index, the method further comprising:
    identifying a mapping between a set of preamble indices and a set of antenna arrays; and
    determining the second antenna array to use transmit the random access signal based at least in part on the preamble index and the identified mapping.

4. The method of claim 2, wherein receiving the received control channel order that comprises the indication comprises:
    receiving a downlink control information indicating the second antenna array.

5. The method of claim 2, further comprising:
    receiving, before receiving the control channel order that comprises the indication, a downlink reference signal associated with the second antenna array; and
    determining to use the second antenna array to transmit the random access signal based at least in part on the received downlink reference signal being associate with the second antenna array.

6. The method of claim 1, wherein:
    receiving the indication comprises receiving, from the first base station, a signal indicating that the UE is to establish a connection with the second base station, the received signal indicating the second antenna array; and
    transmitting the random access signal comprises transmitting the random access signal to the second base station using the second antenna array based at least in part on the received signal.

7. The method of claim 6, further comprising:
    performing, using the second antenna array indicated by the received signal, an initial access procedure with the second base station, wherein the transmitted random access signal is a part of the initial access procedure, the first base station is a primary base station of a dual connectivity configuration, and the second base station is a secondary base station of the dual connectivity configuration.

8. The method of claim 6, further comprising:
performing, using the second antenna array indicated by the received signal, a handover procedure from the first base station to the second base station, wherein the transmitted random access signal is a part of the handover procedure, the first base station is a source base station of the handover procedure, and the second base station is a target base station of the handover procedure.

9. The method of claim 1, wherein receiving the indication comprises receiving, from the first base station, a first message indicating that the UE is to establish a connection with the second base station, and the method further comprises:
transmitting, to the first base station, a second message indicating the second antenna array that the UE is to use to establish the connection with the second base station; and
transmitting the random access signal comprises transmitting the random access signal to the second base station using the second antenna array based at least in part on the transmitted second message.

10. The method of claim 9, further comprising:
performing, using the second antenna array indicated by the transmitted second message, an initial access procedure with the second base station, wherein the transmitted random access signal is a part of the initial access procedure, the first base station is a primary base station of a dual connectivity configuration, and the second base station is a secondary base station of the dual connectivity configuration.

11. The method of claim 9, further comprising:
performing, using the second antenna array indicated by the transmitted second message, a handover procedure from the first base station to the second base station, wherein the transmitted random access signal is a part of the handover procedure, the first base station is a source base station of the handover procedure, and the second base station is a target base station of the handover procedure.

12. The method of claim 1, wherein:
receiving the indication comprises:
receiving, from the first base station, a first signal indicating that the UE is to establish a connection with the second base station;
receiving, from the first base station, a second signal indicating the second antenna array; and
transmitting the random access signal comprises transmitting the random access signal to the second base station using the second antenna array based at least in part on the received signal.

13. The method of claim 1, further comprising:
receiving, from the first base station in response to the transmitted random access signal, a timing advance value for the second antenna array.

14. A method for wireless communication at a first base station, comprising:
communicating with a user equipment (UE);
identifying a plurality of antenna arrays of the UE, the plurality of antenna arrays comprising at least a first antenna array used to communicate with the first base station and a second antenna array; and
transmitting, to the UE, an indication that the UE is to use the second antenna array to transmit a random access signal to the first base station or a second base station.

15. The method of claim 14, further comprising:
receiving, from the UE based at least in part on the transmitted indication, the random access signal; and
transmitting, to the UE in response to the received random access signal, a timing advance value for the second antenna array.

16. The method of claim 14, wherein transmitting the indication comprises:
transmitting a control channel order that comprises the indication that the UE is to use the second antenna array to transmit the random access signal.

17. The method of claim 16, further comprising:
identifying a mapping between a set of preamble indices and a set of antenna arrays of the UE; and
determining a preamble index corresponding to the second antenna array that the UE is to use to transmit the random access signal, wherein the transmitted indication comprises the determined preamble index.

18. The method of claim 16, wherein transmitting the received control channel order that comprises the indication comprises:
transmitting a downlink control information indicating the second antenna array.

19. The method of claim 16, further comprising:
transmitting, before transmitting the control channel order that comprises the indication, a downlink reference signal associated with the second antenna array, the UE to use the second antenna array to transmit the random access signal based at least in part on the downlink reference signal being associate with the second antenna array.

20. The method of claim 14, wherein:
transmitting the indication comprises transmitting a signal indicating that the UE is to establish a connection with the second base station, the transmitted signal indicating the second antenna array.

21. The method of claim 20, wherein the signal indicating that the UE is to establish the connection with the second base station comprises a request for the UE to perform an initial access procedure with the second base station, wherein the first base station is a primary base station of a dual connectivity configuration, and the second base station is a secondary base station of the dual connectivity configuration.

22. The method of claim 20, wherein the signal indicating that the UE is to establish the connection with the second base station comprises a request for the UE to perform a handover procedure to the second base station, wherein the first base station is a source base station of the handover procedure, and the second base station is a target base station of the handover procedure.

23. The method of claim 14, wherein transmitting the indication comprises transmitting, to the UE, a first message indicating that the UE is to establish a connection with the second base station, and the method further comprises:
receiving, from the UE, a second message indicating the second antenna array that the UE is to use to establish the connection with the second base station.

24. The method of claim 23, wherein the second message indicates that the UE is to perform an initial access procedure with the second base station.

25. The method of claim 23, wherein the second message indicates that the UE is to perform a handover procedure with the second base station.

26. The method of claim 14, wherein transmitting the indication comprises:
   transmitting, to the UE, a first signal indicating that the UE is to establish a connection with the second base station; and
   transmitting, to the UE, a second signal indicating the second antenna array.

27. An apparatus for wireless communication at a user equipment (UE), comprising:
   a processor,
   memory in electronic communication with the processor; and
   instructions stored in the memory and executable by the processor to cause the apparatus to:
      communicate with a first base station using a first antenna array of a plurality of antenna arrays of the UE;
      receive, from the first base station, an indication that the UE is to use a second antenna array of the plurality of antenna arrays to transmit a random access signal; and
      transmit, to the first base station or a second base station, the random access signal using the second antenna array based at least in part on the received indication.

28. The apparatus of claim 27, wherein the instructions to receive the indication are executable by the processor to cause the apparatus to:
   receive a control channel order that comprises the indication that the UE is to use the second antenna array to transmit the random access signal.

29. An apparatus for wireless communication at a first base station, comprising:
   a processor,
   memory in electronic communication with the processor; and
   instructions stored in the memory and executable by the processor to cause the apparatus to:
      communicate with a user equipment (UE);
      identify a plurality of antenna arrays of the UE, the plurality of antenna arrays comprising at least a first antenna array used to communicate with the first base station and a second antenna array; and
      transmit, to the UE, an indication that the UE is to use the second antenna array to transmit a random access signal to the first base station or a second base station.

30. The apparatus of claim 29, wherein the instructions are further executable by the processor to cause the apparatus to:
   receive, from the UE based at least in part on the transmitted indication, the random access signal; and
   transmit, to the UE in response to the received random access signal, a timing advance value for the second antenna array.

* * * * *